United States Patent [19]
Weinberger

[11] 3,983,382
[45] Sept. 28, 1976

[54] ADDER WITH FAST DETECTION OF SUM EQUAL TO ZEROES OR RADIX MINUS ONE
[75] Inventor: Arnold Weinberger, Poughkeepsie, N.Y.
[73] Assignee: International Business Machines Corporation, Armonk, N.Y.
[22] Filed: June 2, 1975
[21] Appl. No.: 583,023

[52] U.S. Cl. .............................................. 235/173
[51] Int. Cl.² ....................................... G06F 7/50
[58] Field of Search ................... 235/173, 174, 175

[56] References Cited
UNITED STATES PATENTS
3,566,098   2/1971   Kono ............................... 235/175
3,629,565   12/1971  Schmookler ..................... 235/174
3,697,735   10/1972  Hanson ............................ 235/175

Primary Examiner—David H. Malzahn
Attorney, Agent, or Firm—Robert W. Berray

[57] ABSTRACT

Logic circuits in an adder for use in data processing for the detection of a sum of all ZEROES together with the mathematics upon which the circuits are based. Circuits and mathematics are also disclosed for a detection of a sum of all digits equal to the radix less one. Each of these detected sum conditions are produced prior to or at least concurrently with the production of the sum itself.

18 Claims, 20 Drawing Figures

FIG. 1 PRIOR ART
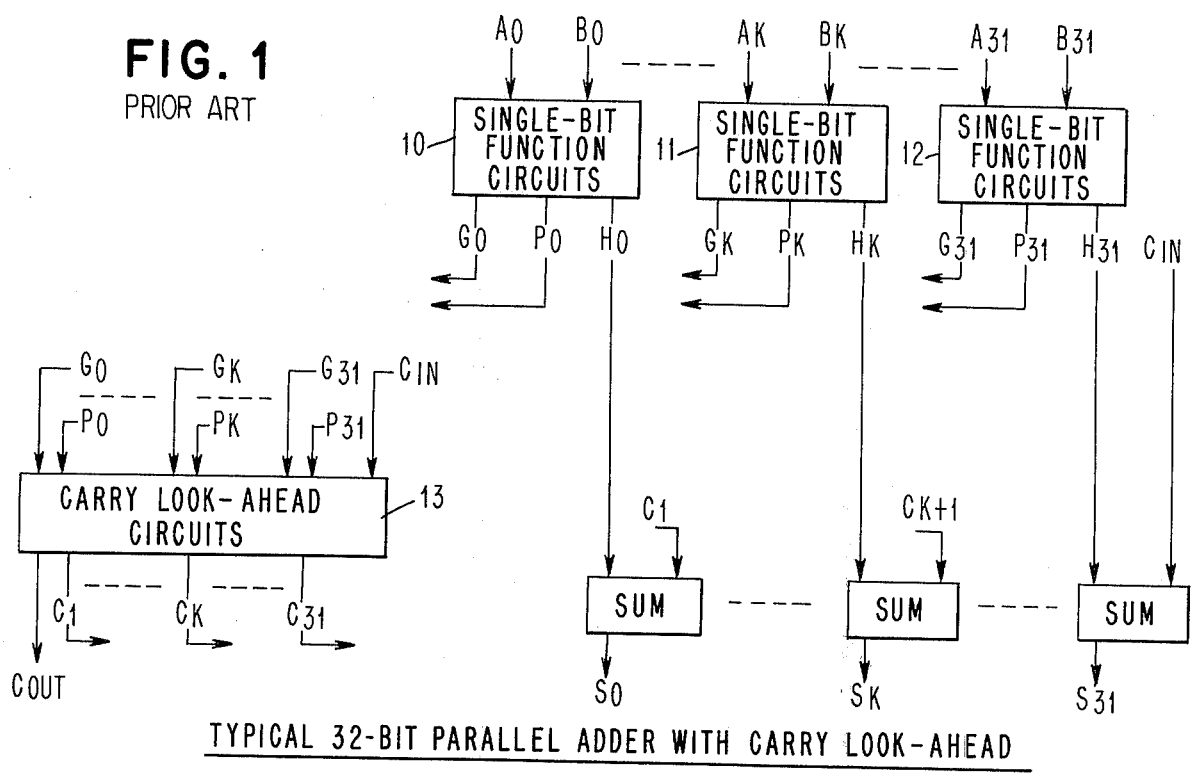
TYPICAL 32-BIT PARALLEL ADDER WITH CARRY LOOK-AHEAD
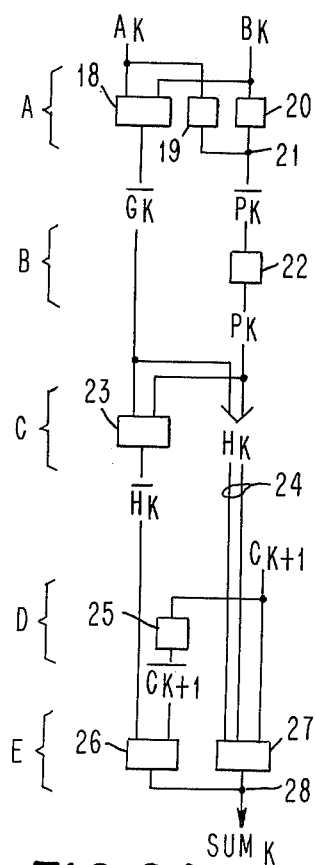
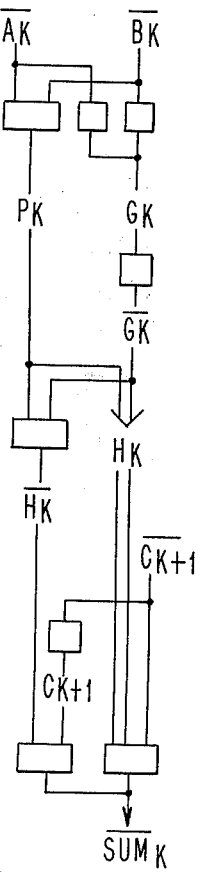
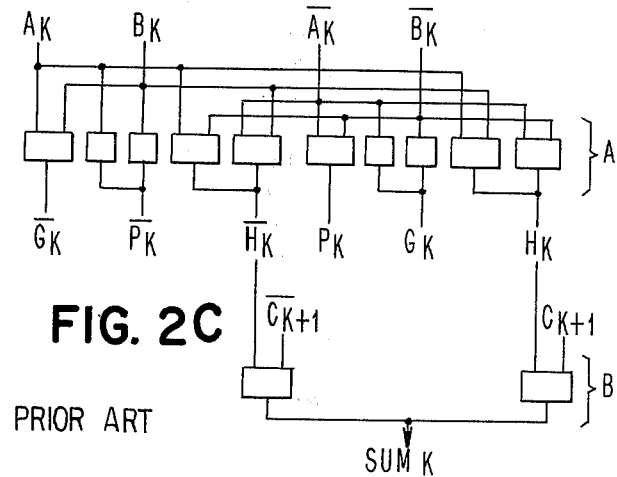
FIG. 2C PRIOR ART
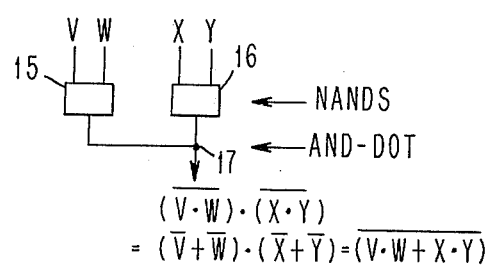
$(\overline{V \cdot W}) \cdot (\overline{X \cdot Y})$
$= (\overline{V} + \overline{W}) \cdot (\overline{X} + \overline{Y}) = \overline{(V \cdot W + X \cdot Y)}$
FIG. 2A    FIG. 2B    FIG. 2D

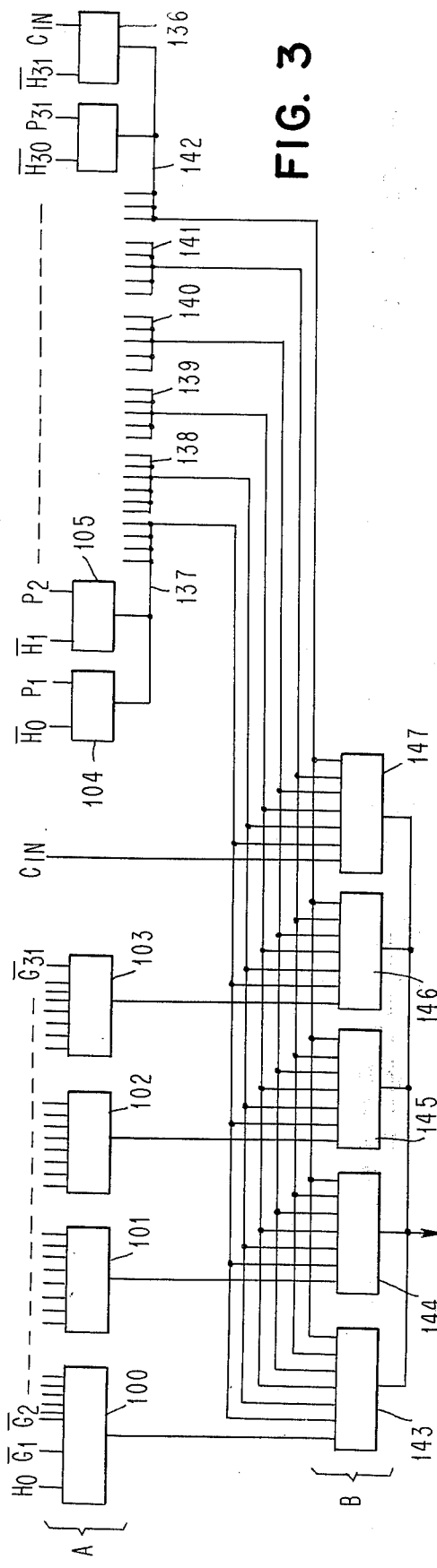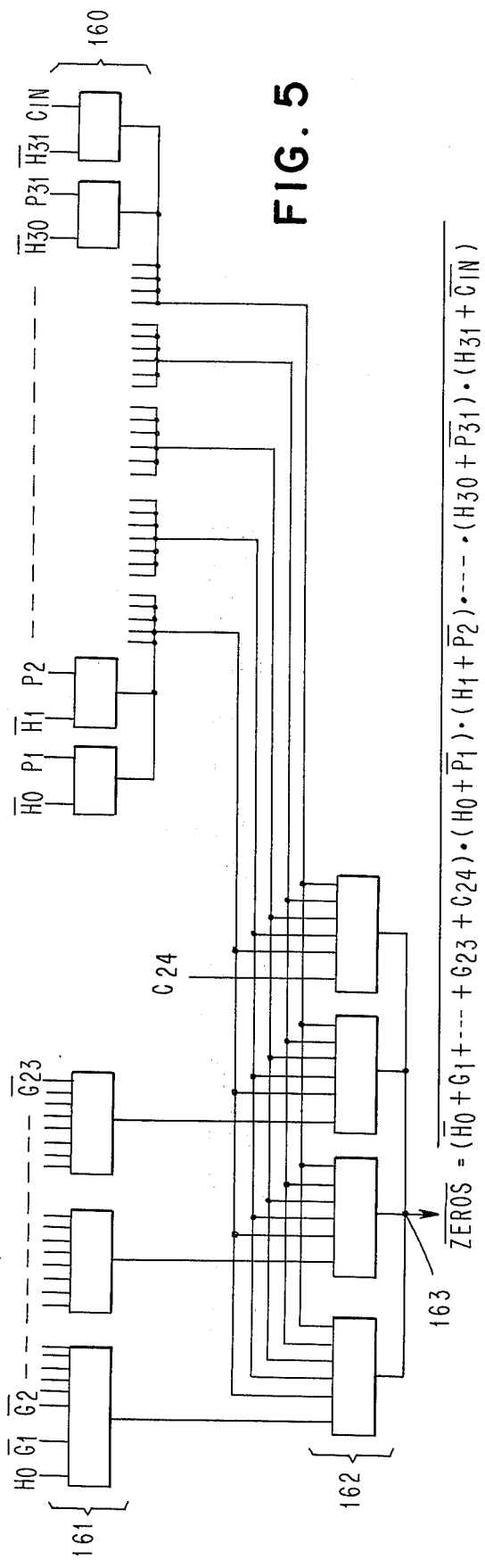

FIG. 4

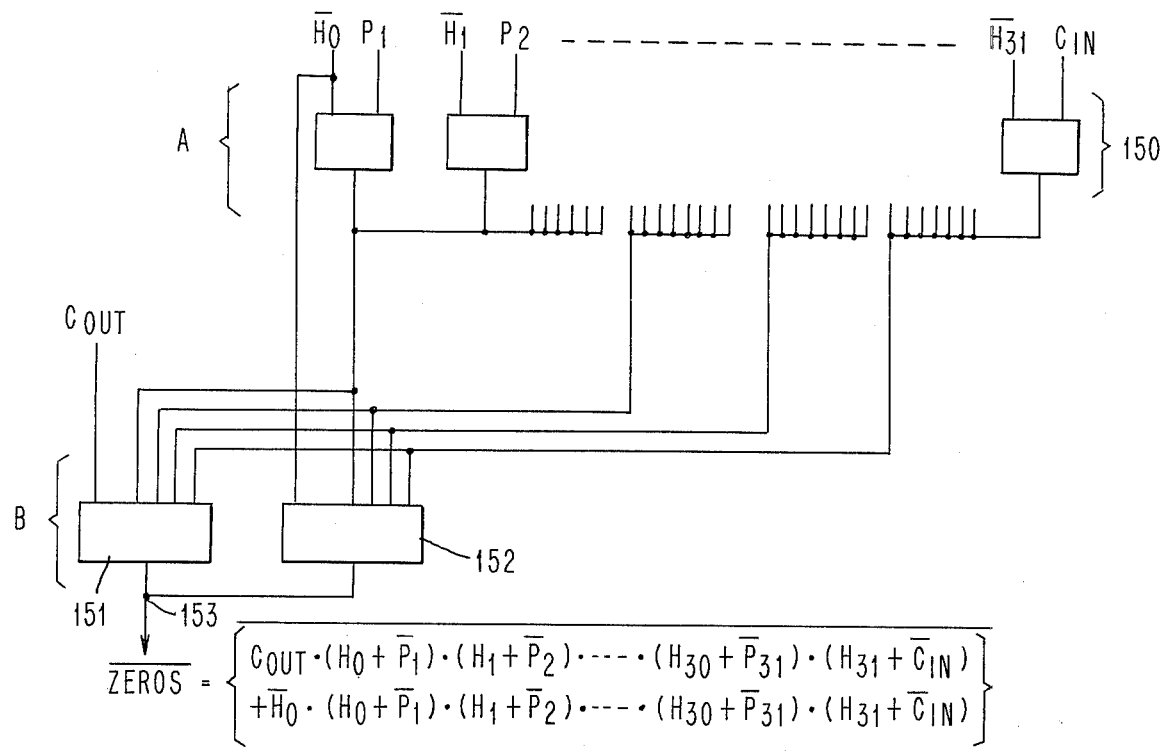

$$\overline{ZEROS} = \left\{ \begin{array}{l} C_{OUT} \cdot (H_0 + \overline{P}_1) \cdot (H_1 + \overline{P}_2) \cdots (H_{30} + \overline{P}_{31}) \cdot (H_{31} + \overline{C}_{IN}) \\ + \overline{H}_0 \cdot (H_0 + \overline{P}_1) \cdot (H_1 + \overline{P}_2) \cdots (H_{30} + \overline{P}_{31}) \cdot (H_{31} + \overline{C}_{IN}) \end{array} \right\}$$

FIG. 7

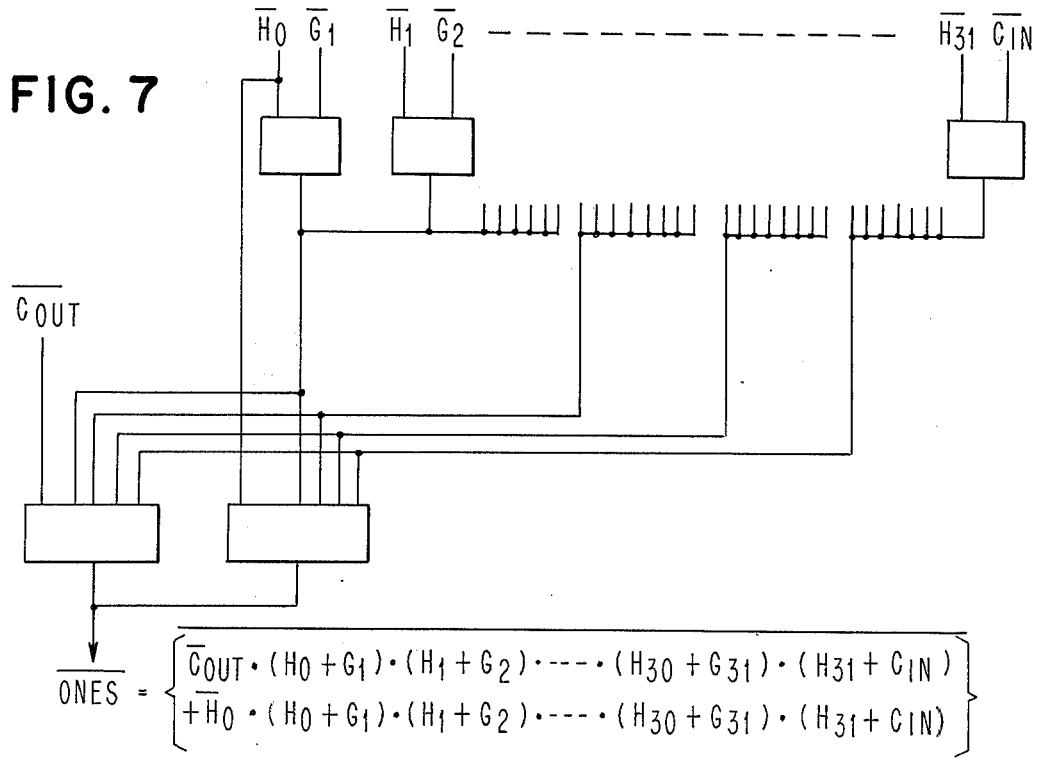

$$\overline{ONES} = \left\{ \begin{array}{l} \overline{C}_{OUT} \cdot (H_0 + G_1) \cdot (H_1 + G_2) \cdots (H_{30} + G_{31}) \cdot (H_{31} + C_{IN}) \\ + \overline{H}_0 \cdot (H_0 + G_1) \cdot (H_1 + G_2) \cdots (H_{30} + G_{31}) \cdot (H_{31} + C_{IN}) \end{array} \right\}$$

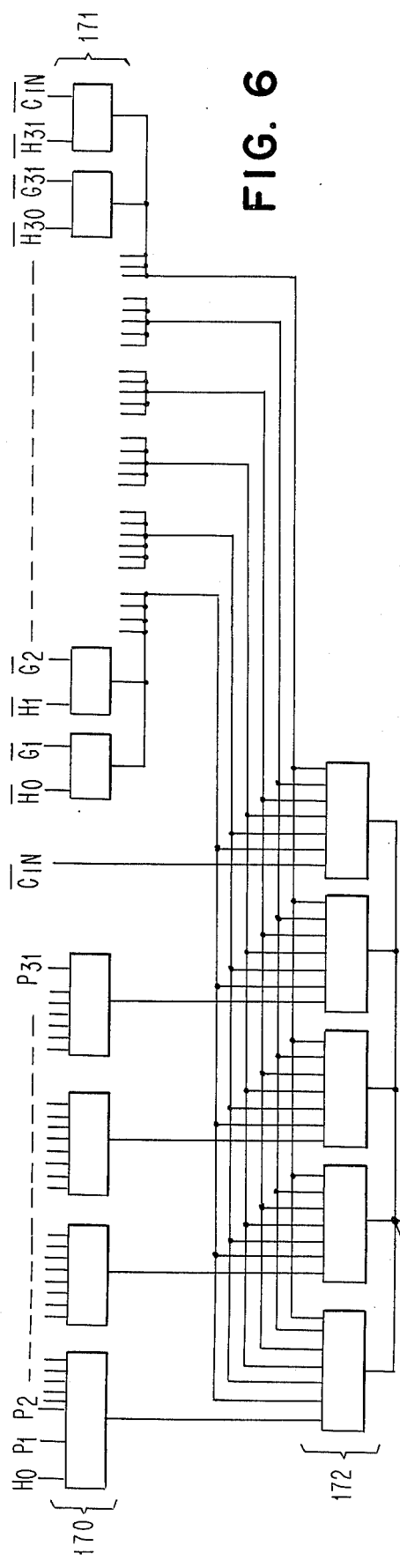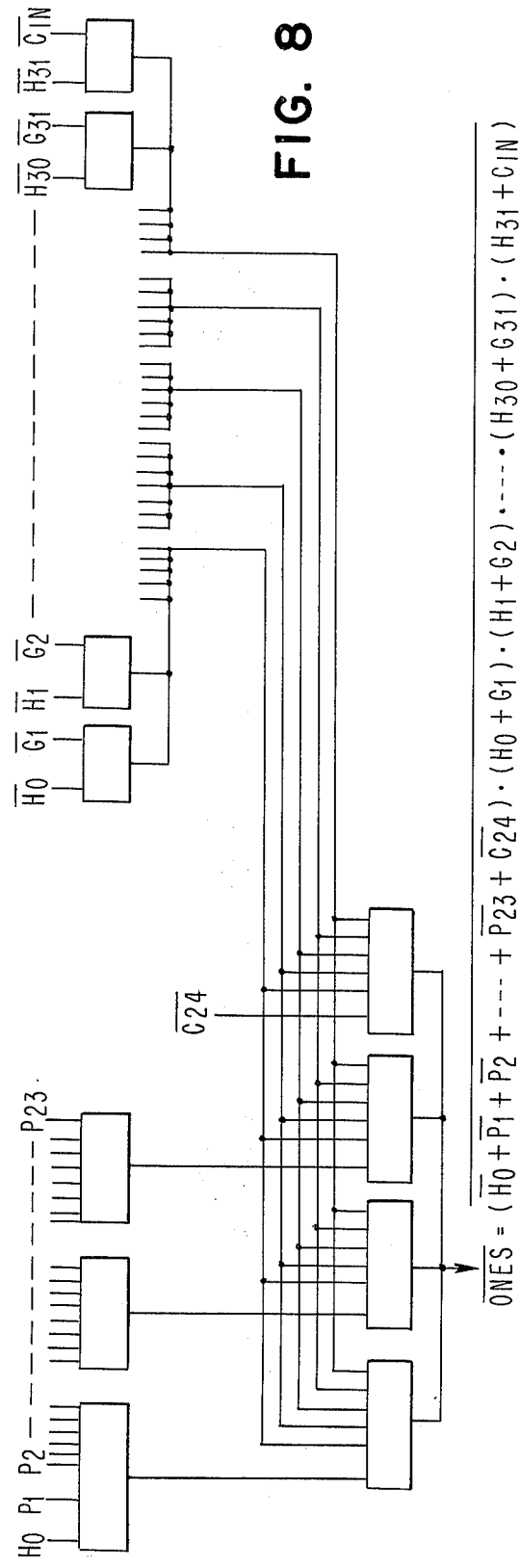

TYPICAL n-DIGIT RADIX-r PARALLEL ADDER WITH CARRY LOOK-AHEAD

FIG. 13 TYPICAL 8-DIGIT (32-BIT) PARALLEL DECIMAL ADDER WITH CARRY LOOK-AHEAD $$\overline{ZEROS} = \overline{[(0)_{0,10} + (1)_{10} + \cdots + (7)_{10} + C_{IN}] \cdot [(0)_9 + (1)_0] \cdots [(6)_9 + (7)_0] \cdot [(7)_9 + \overline{C_{IN}}]}$$

$$\overline{NINES} = \overline{[(0)_{18} + (0)_8 + (1)_8 + \cdots + (7)_8 + \overline{C_{IN}}] \cdot [(0)_9 + (1)_{18}] \cdots [(6)_9 + (7)_{18}] \cdot [(7)_9 + C_{IN}]}$$

ADDER WITH FAST DETECTION OF SUM EQUAL TO ZEROES OR RADIX MINUS ONE

INCORPORATED REFERENCES

The following publications are incorporated by reference into this patent application.

U.S. Pat. No. 2,879,001 to A. Weinberger et al. entitled "High Speed Binary Adder Having Simultaneous Carry Generation" assigned to The United States of America.

"A One Microsecond Adder Using One Megacycle Circuitry" by A. Weinberger and J. L. Smith, IRE Transactions On Electronic Computers, June 1956, Pages 65–73.

U.S. Pat. No. 3,629,565 to Martin S. Schmookler and Arnold Weinberger entitled "Decimal Adder For Directly Implementing BCD Addition Utilizing Logic Circuitry" assigned to International Business Machines Corporation, Armonk, New York.

"High Speed Decimal Addition" by M. S. Schmookler and A. Weinberger, IEEE Transactions On Computers, August 1971, Pages 862–866.

The first two above-named incorporated references are similar in content both describing a parallel binary adder having carry look ahead circuits. Similarly, the third and fourth above-named incorporated references discuss parallel decimal adders incorporating carry look ahead circuits.

SUM DETECTION CIRCUITS

This patent application relates to circuits for detecting zero sums and radix less 1 sums in data processing equipment and more particularly to circuits which detect such sums prior to the actual summation.

BACKGROUND OF THE INVENTION

In digital computers a common requirement accompanying an adder is to detect the condition when all the sum bits are equal to zero. While not as common, it is sometimes necessary to detect the condition when all the sum bits are equal to the radix less 1, for example, in the binary case when all the sum bits are equal to 1 or in the decimal case when all the sum bits are equal to 9. In the prior art those conditions are found by first performing the addition and then ANDing the result with ZEROS or with NINES or with ONES to determine whether such a sum has been found. Obviously, the detection of such a sum cannot occur until after the summation is complete. Since in many cases the attainment of a sum will complete a machine cycle the further logic operations that are necessary to AND the sum with ZEROS, with NINES or with ONES will take an additional machine cycle and the branch operations which key off the detection will be delayed. It is, therefore, the general object of this invention to eliminte the need of such an additional machine cycle by providing means for detecting a sum of all ZEROS, all ONES, all NINES or indeed of any radix less 1 sum prior to or at least concurrently with the production of the sum. It is an additional object of the invention to incorporate the detection circuits into an adder with carry look-ahead in such a manner that the circuits for generating existing digit functions can be utilized in the detection process.

SUMMARY OF THE INVENTION

This invention is to logic circuits which detect a summation of all ZEROS or a summation of all radix less 1 digits without first performing the addition. In the binary case, the carry generate, carry propagate and half-sum functions generated for use in the carry look-ahead adder are utilized as input to the detection circuits. In the decimal case where a BCD representation of the sum is used, the carry generate and carry propagate functions are generated by providing threshold functions for input to both carry look-ahead and detection circuits.

DETAILED DESCRIPTION OF THE DRAWINGS

The foregoing and other objects, features and advantages of the invention will be apparent from the following detailed description of the invention as illustrated in the accompanying drawings wherein:

FIG. 1 is a block diagram of prior art binary carry look ahead adders such as are described in detail in the first two incorporated references.

FIGS. 2A, 2B and 2C are logic circuits such as are used in the FIG. 1 adder.

FIG. 2D is a diagram illustrating the operation of the NAND/AND-DOT logic family.

FIG. 3 is a logic circuit representation of a first embodiment of the invention.

FIGS. 4–8 are circuits describing other embodiments of the invention.

FAST DETECTION OF A SUM WHOSE DIGITS ARE ALL EQUAL TO ZERO

Figure 9:
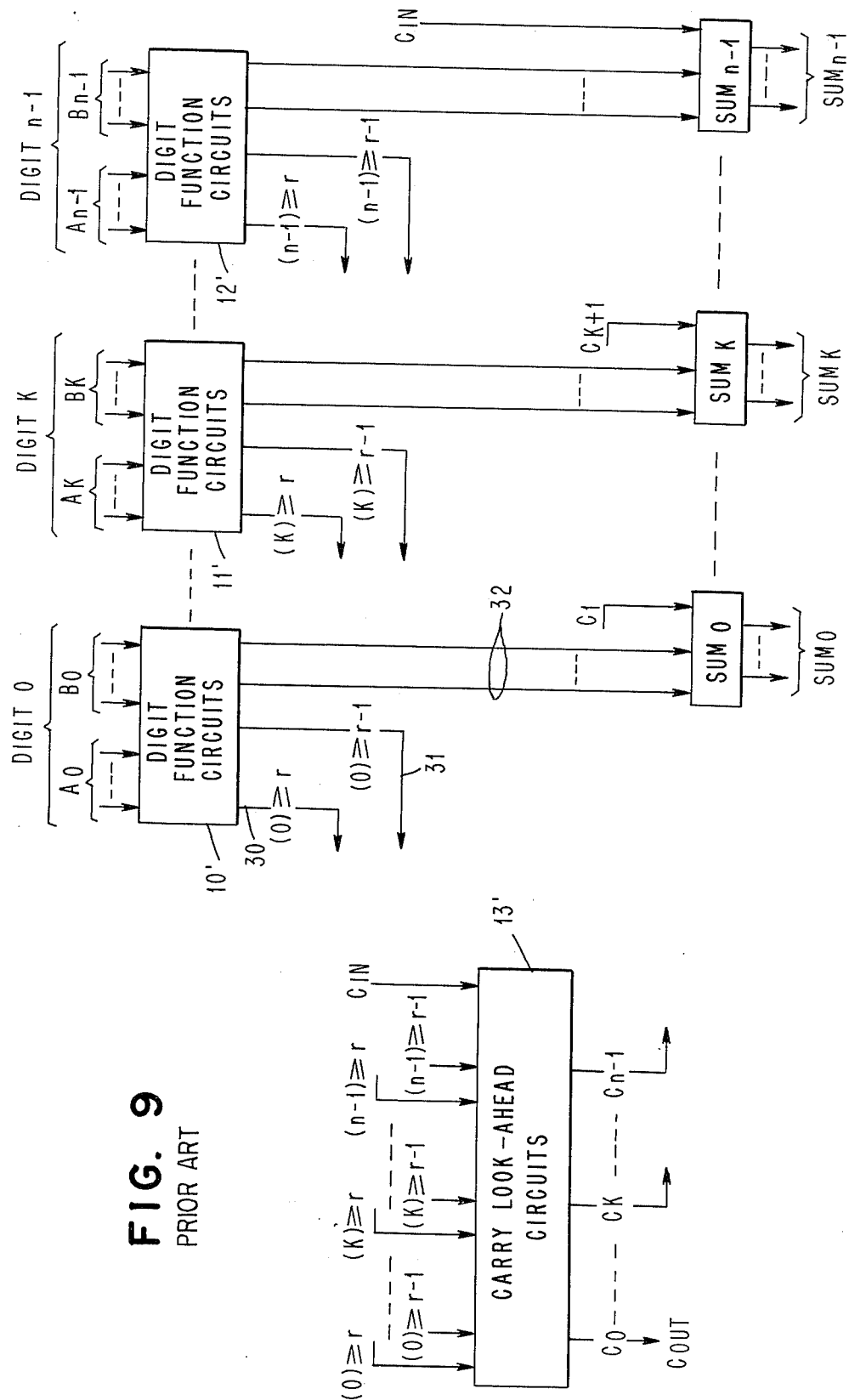
FIG. 9 is similar to FIG. 1 showing a typical adder for an $n$-digit radix-$r$ parallel adder with carry look ahead.

Before describing the circuits through which the zero sum bits are detected in an adder it is desirable first to describe the mathematics upon which these circuits rest. For purposes of illustration both the circuits and the following mathematics will be restricted to a 32 bit adder, although the invention is applicable to adders of any size.

The following mathematical analysis will begin with the binary adder and then will be extended to adders of higher radices notably decimal.

A. The Binary Adder

In the case of a 32 bit adder, let A with subscripts 0 to 31 represent the 32 bits of the addend and let B with subscripts 0 to 31 equal the 32 bits of the augend. Therefore, in equation form:

Let $A = (A_0, A_1, \ldots, A_{31})$ = addend $B = (B_0, B_1, \ldots, B_{31})$ = augend where the subscripts refer to the bit positions, 0–31, high-to-low order, respectively.

It is well known that in performing additions there are various functions of individual bit positions which are useful both in analysis and for circuit design. One such function expresses the condition of a half-sum or exclusive OR of the two bits at a bit position. That is, if you take the two individual bits (one from the addend and one from the augend) comprising a bit position and add them, and if one, and only one, of those individual bits is on, then you have the half sum or exclusive OR condition. To express the relationship mathematically with H designating the half-sum:

$H_K = A_K \not\equiv B_K = \bar{A}_K \cdot B_K + A_K \cdot \bar{B}_K$ = half-sum of bit position $K$ Thus, the function $H$ is equal to $A$ exclusive Ored with $B$ at an individual bit position $K$, and also the function $H$ is equal to $\bar{A} \cdot B + A \cdot \bar{B}$. The latter mathematical description says that if you do not have an A and you do have a B or if you have an A and you do not have a B then you have the function H.

A second very useful function of an individual bit position may be termed the carry generate, G, which expresses the condition in which both A and B bits are on. That is, mathematically:

$G_K = A_K \cdot B_K$ = carry generate of bit position $K$

This function is called a carry generate since when the $A$ and $B$ bits are added, it will result in a carry over to the next high order position.

A third very useful function of an individual bit position is the carry propagate, P, which may be defined as the OR condition where either the A bit or the B bit is on. Mathematically:

$P_K = A_K + B_K$ = carry propagate of bit position $K$

This function is called a propagate since when the $A$ and $B$ bits are added, it will propagate a one that is carried into it from the next low order bit position.

These functions of the individual bit positions may be related mathematically. For example, the function H which is the condition where one, and only one, of the two individual bits are on, can be expressed by stating that: if the condition P, where one or both bits are on, is ANDed with the not of function G, which says that either one is on or neither are on, the result is one, i.e., H, since one is the common condition. Therefore, $H = P \cdot \bar{G}$.

Also, the function G may be related to the functions H and P. Function G represents the condition where both A and B bits are on. H represents the function where only one is on, and P represents the function where one or both are on. The function $\bar{H}$ is equal to the inverse of H and expresses the condition of either zero bits on or two bits on. If $\bar{H}$ is ANDed with the P function the result expresses the condition where zero or two are ANDed with one or two, and since the only condition in common is two, which says that both bits are on, the AND of $\bar{H}$ and P results in the function G. Mathematically: $G = \bar{H} \cdot P$.

To state the relationship of H and G to the function P we may note that P is the case where one or two bits are on. H is the condition where only one bit is on, and G is the condition where both bits are on. Therefore, if one bit H is on or both bits G are on, the P condition is expressed by the ORing of functions H and G, that is, the condition in which either one or two bits are on. Mathematically: $P = H + G$.

Of course, the complements of each of these functions are also true and for convenience all of these functions are grouped and stated below:

| | |
|---|---|
| $H_K = P_K \cdot \bar{G}_K$ | $\bar{H}_K = \bar{P}_K + G_K$ |
| $G_K = \bar{H}_K \cdot P_K$ | $\bar{G}_K = H_K + \bar{P}_K$ |
| $P_K = H_K + G_K$ | $\bar{P}_K = \bar{H}_K \cdot \bar{G}_K$ |

In addition to the 32 bit positions being added in the adder, there is an additional bit to be included among the inputs. It is the input carry $C_{in}$ from a previous operation.

To analyze the operations of an adder, the functions H, G and P can be profitably utilized. For example, one of the objects of the present invention is the early detection of the generation of a sum of all zeros in an adder. That is, detecting such a sum even before the summation is completed. Upon analysis, it is clear that there are three conditions which can produce a sum of all zeros. One of these conditions is present if all the inputs are zeros, that is, all of the A bit positions and all of the B bit positions, and the carry in bit, are all zeros. To express that mathematically, we need only say that all of the inputs are $\bar{P}$ and $\bar{C}_{in}$.

The second condition in which a sum of all zeros is generated is where the input carry is zero, where the A and B bits of the low order 31 bit positions are all zero and where in the high order bit both the A and the B bits are one. In that case, the high order bit position produces a zero when added and there is a generated output carry.

The second condition is also present if the A and B bits of the 30 low order bit positions are all zeros, the carry in bit is zero, bit position one has both A and B bits on, and in the high order bit position one, and only one, of the bits is on. The sum here will again produce all zeros in the adder with the carry from bit position one leaving a zero in its wake.

The second condition is also present if the low order 29 bits are zeros, the carry in bit is zero, bit position two has both bits on and bit position zero and one each have exactly one bit on. Again, there is a generated carry in bit position two that propagates leving zeros in its wake. The expression of this second condition can be continued through all of the remaining bit positions.

The third condition producing a sum of all zeros is where the carry in bit is on, and all bit positions have one, and only one, bit on. In this case the carry in bit will propagate through all of the positions leaving zeros in its wake.

The above are the three conditions, and the only three conditions that can produce a sum of all zeros. These conditions may be expressed mathematically:

$$\text{ZEROS} = \bar{P}_0 \cdot \bar{P}_1 \cdot \bar{P}_2 \ldots \ldots \bar{P}_{31} \cdot \bar{C}_{in}$$
$$+ G_0 \cdot \bar{P}_1 \cdot \bar{P}_2 \ldots \ldots \bar{P}_{31} \cdot \bar{C}_{in}$$

-continued $$+ H_0 \cdot G_1 \cdot \overline{P}_2 \ldots \ldots \overline{P}_{31} \cdot \overline{C}_{in}$$
$$\vdots$$
$$+ H_0 \cdot H_1 \cdot H_2 \ldots \ldots G_{31} \cdot \overline{C}_{in}$$
$$+ H_0 \cdot H_1 \cdot H_2 \ldots \ldots H_{31} \cdot C_{in} \quad (1)$$

In equation 1 above, the first line represents the first condition, that is, where all inputs are zeros. The second line represents one case of the second condition where $C_{in}$ is zero and the low order 31 bits are zeros, but both bits are on in the high order bit. The third line represents a second case of the second condition where $C_{in}$ is zero, the low order 30 bits are zero, both bits are on in the first bit position, and one, and only one, bit is on in the high order bit position. The remaining terms expressing the second condition are not written out, but finally, the last variation of this second condition is shown in the next to last line of equation 1. Here, $C_{in}$ is zero, both bits are on in the low order bit position, and one, and only one, bit is on in each of the high order 31 bit positions. The bottom line of equation 1 represents the third condition where the carry in, $C_{in}$, is on and all 32 bits of the adder have one, and only one, bit on in each bit position.

While a circuit for equation 1 might be built, it is desirable to combine as many terms as possible to achieve the most economical and fastest circuit arrangement possible. Therefore, in combining the terms of equation 1 we may first note that $\overline{P}$ is a common factor to all bit positions in both lines 1 and 2 from bit position 1 through 31, while $(\overline{P}_0 + G_0)$ represents the uncommon factor. Since the factor $(\overline{P}_0 + G_0) = \overline{H}_0$, $\overline{H}_0$ can be substituted.

Thus, with the first two terms of equation 1 combined as above, equation 2 below may be written.

$$ZEROS = \overline{H}_0 \cdot \overline{P}_1 \cdot \overline{P}_2 \ldots \ldots \overline{P}_{31} \cdot \overline{C}_{in}$$
$$+ H_0 \cdot G_1 \cdot \overline{P}_2 \ldots \ldots \overline{P}_{31} \cdot \overline{C}_{in}$$
$$\vdots$$
$$+ H_0 \cdot H_1 \cdot H_2 \ldots \ldots G_{31} \cdot \overline{C}_{in}$$
$$+ H_0 \cdot H_1 \cdot H_2 \ldots \ldots C_{in} \quad (2)$$

The next compression of terms involves the first two lines in equation 2. Note, that $\overline{P}$ is a common factor to all of the bit positions in both lines from 2 through 31. Thus, we can factor out $(\overline{H}_0 \cdot \overline{P}_1) + (H_0 \cdot G_1)$. This factor can be rewritten $(H_0 + \overline{P}_1) \cdot (\overline{H}_0 + G_1)$ thus producing equation 3 below, noting that $\overline{H}_0 \cdot H_0 = G_1 \cdot \overline{P}_1 = 0$.

$$ZEROES = (\overline{H}_0 + G_1) \cdot (H_0 + \overline{P}_1) \cdot \overline{P}_2 \ldots \ldots \overline{P}_{31} \cdot \overline{C}_{in}$$
$$+ H_0 \cdot H_1 \cdot G_2 \ldots \ldots \overline{P}_{31} \cdot \overline{C}_{in}$$
$$\vdots$$
$$+ H_0 \cdot H_1 \cdot H_2 \ldots \ldots G_{31} \cdot \overline{C}_{in}$$
$$+ H_0 \cdot H_1 \cdot H_2 \ldots \ldots H_{31} \cdot C_{in} \quad (3)$$

The process of combining the first two terms of equation 3 is repeated again and again until only a single term remains as shown in equation 4 below.

$$ZEROS = (\overline{H}_0 + G_0 + \ldots + G_{31} + C_{in}) \cdot (H_0 + \overline{P}_1) \cdot (H_1 + \overline{P}_2) \cdot \ldots \cdot (H_{30} + \overline{P}_{31}) \cdot (H_{31} + \overline{C}_{in}) \quad (4)$$

Equation 4 represents an expression for which circuits can be built to operate in a very efficient and quick manner. There is, however, an opportunity to simplify the circuit by making use of the output carry of the adder $C_{out}$ to replace the expression $(G_1 + \ldots + G_{31} + C_{in})$. Circuits to generate output carries are found in the incorporated patents and adders with such circuits are generally known in the art as carry look ahead adders. The alternate equation is:

$$ZEROS = (C_{out} + \overline{P}_0) \cdot (H_0 + \overline{P}_1) \cdot \ldots \cdot (H_{30} + \overline{P}_{31}) \cdot (H_{31} + \overline{C}_{in}) \quad (5)$$

The alternate expression is based on the fact that in equation 4 there was a series of G terms. Since the G function represents the condition where both A and B bits are on, it represents the situation in which there is an output carry from that bit position. Therefore, it is possible to replace this expression, which would involve an OR circuit with a large number of inputs, with the simple carry out term. That is what is shown in equation 5. Since it is possible to find the carry out prior to the summation due to the carry look ahead feature of adders, equation 5 becomes a preferred implementation for the detection of the zeros sum. It should be noted that circuits based on equation 5 may take at least one additional logic level to arrive at the zero sum (and therefore some additional time), but the number of circuits involved to detect the zero sum will be fewer than for equation 4.

In deriving equation 5, note that $C_{out}$ can be expressed as in equation 6 below.

$$C_{out} = G_0$$
$$+ H_0 \cdot G_1$$
$$\vdots$$
$$+ H_0 \cdot H_1 \ldots \ldots G_{31}$$
$$+ H_0 \cdot H_1 \ldots \ldots H_{31} \cdot C_{in} \quad (6)$$

Equation 6 is an exhaustive list of all of the conditions that can produce $C_{out}$. In equation 1 those factors which contain a G term represent the conditions where a carry is being generated in one bit position and emerges as a carry out, leaving zeros in its wake as it propagates through the Hs. This can be expressed by the carry out term by substituting for each G factor that which is shown in equation 6. For example, if you substitute equation 6 for $G_0$ in equation 1, the first term of $C_{out}$ goes in directly, that is, $G_0$. The second term is $H_0 \cdot G_1 \cdot \overline{P}_1$. Substituting now for $\overline{P}_1$ its value of $\overline{H}_1 \cdot \overline{G}_1$ the term contains the factors $G_1 \cdot \overline{G}_1$ which reduces the term to zero. Similarly, all of the other terms in the expansion will contain the $G_K \cdot \overline{G}_K$ resulting in zeros for all terms except the first one which was the $G_0$. Therefore, the substitution of $C_{out}$ into equation 1 will result in a simple replacement of $C_{out}$ for each $G_K$ term in the expansion. The result of such a substitution is shown in equation 7 below.

$$ZEROS = \overline{P}_0 \cdot \overline{P}_1 \cdot \overline{P}_2 \ldots \ldots \overline{P}_{31} \cdot \overline{C}_{in}$$
$$+ C_{out} \cdot \overline{P}_1 \cdot \overline{P}_2 \ldots \ldots \overline{P}_{31} \cdot \overline{C}_{in}$$
$$+ H_0 \cdot C_{out} \cdot \overline{P}_2 \ldots \ldots \overline{P}_{31} \cdot \overline{C}_{in}$$

$$+ H_0 \cdot H_1 \cdot H_2 \ldots \ldots C_{out} \cdot \overline{C}_{in}$$
$$+ H_0 \cdot H_1 \cdot H_2 \ldots \ldots H_{31} \cdot C_{out} \tag{7}$$

Equation 7 may now be compressed iteratively by combining the first two terms in much the same manner as was previously described concerning the compression of equation 1 to generate equation 4. For example, the first two terms in equation 7 can be combined as shown below.

$$(C_{out} + \overline{P}_0) \cdot \overline{P}_1 \cdot \overline{P}_2 \ldots \overline{P}_{31} \cdot \overline{C}_{in}$$

Compressing all of the terms in this manner derives the expression which is shown in equation 5.

It should be noted that in implementing equation 5, it is first necessary to produce the value $C_{out}$ after which circuits would have to be provided for performing the operations of equation 5.

To speed the operation, note that since $C_{out}$ includes $G_0$ as a term according to equation 6, $$(C_{out} + \overline{P}_0) = (C_{out} + G_0 + \overline{P}_0) = (C_{out} + \overline{H}_0)$$

so that $$\text{ZEROS} = (C_{out} + \overline{H}_0) \cdot (H_0 + \overline{P}_1) \cdot \ldots \cdot (H_{30} + \overline{P}_{31})$$
$$\cdot (H_{31} + \overline{C}_{in}) \tag{8}$$

Equation 8 may be restated as shown below in equation 9.

$$\text{ZEROS} = C_{out} \cdot (H_0 + \overline{P}_1) \cdot \ldots \cdot (H_{30} + \overline{P}_{31}) \cdot (H_{31} + \overline{C}_{in}) + \overline{H}_0 \cdot (H_0 + \overline{P}_1) \cdot \ldots \cdot (H_{30} + \overline{P}_{31}) \cdot (H_{31} + \overline{C}_{in}) \tag{9}$$

Equation 9 is a valuable variation on equation 5 because an adder design generally produces the single bit functions H, P and G earlier than $C_{out}$. Therefore, a circuit based on equation 9 will permit a single level of delay between the generation of $C_{out}$ and the production of ZEROS.

It should also be noted that the function ZEROS may be expressed as a function of some intermediate carry as well as the output carry. This is shown below in equation 10.

$$\text{ZEROS} = (\overline{H}_0 + G_1 + \ldots + G_{k-1} + C_K) \cdot (H_0 + \overline{P}_1) \cdot \ldots \cdot (H_{30} + \overline{P}_{31}) \cdot (H_{31} + \overline{C}_{in}) \tag{10}$$

Equation 10 provides the circuit designer the facility of using some intermediate carry in the detection of the ZEROS sum. Since intermediate carries may be produced prior to the output carry, the operation may again be made faster although additional logic circuits will be needed.

B. Extension For Adders With Radices > 2

The zero-sum detect method can be generalized to all radices. It is particularly useful for decimal.

Let r = integer radix $\geq 2$
A = $(A_0, \ldots, A_{n-1})$ = addend
B = $(B_0, \ldots, B_{n-1})$ = augend
of an n-digit adder $C_{in}$ = input carry to adder where the subscripts, 0 through $n-1$, refer to digit positions high-to-low order, respectively.

The following functions of a digit position, K, will be used:

$(K)_{r-1}$ = the normalized algebraic sum, $A_K + B_K$, of digit position K which is equal to $r-1$ (the weight of digit position K is normalized to $r^0 = 1$)

$(K)_r$ = the normalized algebraic sum, $A_K + B_K$, of digit position K which is equal to $r$.

$(K)_0$ = the normalized algebraic sum, $A_K + B_K$, of digit position K which is equal to 0.

For binary ($r=2$), the functions $(K)_{r-1}$, $(K)_r$, and $(K)_0$ correspond to $H_K$, $G_K$, $\overline{P}_K$, respectively.

The conditions for generating a sum of all zeros are enumerated in equation 11.

$$\text{ZEROS} = (0)_0 \cdot (1)_0 \cdot (2)_0 \ldots (n-1)_0 \cdot \overline{C}_{in}$$
$$+ (0)_r \cdot (1)_0 \cdot (2)_0 \ldots (n-1)_0 \cdot \overline{C}_{in}$$
$$+ (0)_{r-1} \cdot (1)_r \cdot (2)_0 \ldots (n-1)_0 \cdot \overline{C}_{in}$$
$$\vdots$$
$$+ (0)_{r-1} \cdot (1)_{r-1} \cdot (2)_{r-1} \ldots (n-1)_r \cdot \overline{C}_{in}$$
$$+ (0)_{r-1} \cdot (1)_{r-1} \cdot (2)_{r-1} \ldots (n-1)_{r-1} \cdot C_{in} \tag{11}$$

Equation 11 shows that the ZEROS sum is generated by one of three conditions. The first condition is where the algebraic sum of each addend-augend pair is ZERO and $C_{in} = 0$. The second condition is, if the normalized algebraic sum of one, and only one, addend-augend pair is equal to $r$, (in the decimal case that would be 10) a carry is generated in that digit position. In each trailing position, the addend-augend pair must produce an algebraic sum of ZERO and $C_{in}$ must be zero. In each leading digit position the addend-augend pair must produce the normalized algebraic sum of $r-1$, (in the decimal case 9) which permits the generated carry to pass through leaving ZEROS in its wake. The third condition is if $C_{in}$ equals 1 and the normalized algebraic sum $r-1$ is produced in each digit position. That permits the input carry to pass through leaving ZEROS in its wake.

Next, a compression of terms in equation 11 may be performed in a manner similar to the compression already explained with reference to equation 1, that is, the first two terms of equation 11 are combined and then the resulting term with the next term and so on until eventually only a single term remains as shown in equation 12 below.

$$\text{ZEROS} = [(0)_{o,r} + (1)_r + \ldots + (n-1)_r + C_{in}] \cdot$$
$$[(0)_{r-1} + (1)_0] \cdot \ldots \cdot [(n-2)_{r-1} + (n-1)_0] \cdot$$
$$[(n-1)_{r-1} + \overline{C}_{in}] \tag{12}$$

where $(0)_{o,r}$ means that the normalized algebraic sum, $(A_0 + B_0)$, is equal to $o$ or $r$.

A circuit based on equation 12 may be built to detect a sum of zeros for any radix.

The alternate implementation which makes use of the output carry $C_{out}$ or an intermediate carry is not applicable when some radix other than 2 is used. The reason is apparent if you consider that for $r=2$, $(K)_{\geq r} = (K)_r$, while for $r>2$, $(K)_{\geq r} \neq (K)_r$.
$C_{out} = (0)_{\geq r}$ -continued $$+ (0)_{r-1} \cdot (1)_{\geq r}$$

$$\begin{aligned}&+(0)_{r-1} \cdot (1)_{r-1} \ldots (n-1)_{\geq r} \\ &+(0)_{r-1} \cdot (1)_{r-1} \ldots (n-1)_{r-1} \cdot C_{in}\end{aligned}$$

Note that $(K)_{\geq r}$ means that the normalized algebraic sum, $(A_K + B_K)$, is equal to or larger than $r$ with a maximum possible value of $2(r-1)$.

Thus, a circuit built on equation 12 will detect the zero sum regardless or radix and cannot be simplified with the use of the functions generated from the carry look ahead circuits except in the case of a binary adder.

C. The Decimal Adder

For the decimal adder the radix equals 10 and equation 12 becomes:

$$\begin{aligned}\text{ZEROS} = &[(0)_{0,10} + (1)_{10} + \ldots + (n-1)_{10} + C_{in}] \cdot \\ &[(0)_9 + (1)_0] \cdot \ldots [(n-2)_9 + (n-1)_0] \cdot [(n-1)_9 + \\ &\overline{C_{in}}]\end{aligned} \quad (13)$$

Let $(A_8, A_4, A_2, A_1)$ and $(B_8, B_4, B_2, B_1)$ be the BCD (binary-coded decimal) representation of the decimal addend and augend respectively. The subscripts, 8, 4, 2 and 1 refer to the weight of the respective bits of the decimal digit. Then, $$(K)_0 = (\overline{A_8} \cdot \overline{B_8}) \cdot (\overline{A_4} \cdot \overline{B_4}) \cdot (\overline{A_2} \cdot \overline{B_2}) \cdot (\overline{A_1} \cdot \overline{B_1}) \quad (14)$$

$$(K)_9 = \{[(A_8 \veebar B_8) \cdot (\overline{A_4} \cdot \overline{B_4}) + (A_4 \cdot B_4)] \cdot (\overline{A_2} \cdot \overline{B_2}) + (A_4 \veebar B_4) \cdot (A_2 \cdot B_2)\} \cdot (A_1 \vee B_1) \quad (15)$$

$$\begin{aligned}(K)_{10} = &\{[(A_8 \veebar B_8) \cdot (\overline{A_4} \cdot \overline{B_4}) + (A_4 \cdot B_4)] \cdot (\overline{A_2} \cdot \overline{B_2}) \\ &+ (A_4 \veebar B_4) \cdot (A_2 \cdot B_2)\} \cdot (\overline{A_1} \cdot B_1) + [(A_8 \veebar B_8) \cdot (\overline{A_4} \\ &\cdot \overline{B_4}) + (A_4 \cdot B_4)] \cdot (\overline{A_2} \veebar \overline{B_2}) \cdot (A_1 \cdot B_1)\end{aligned} \quad (16)$$

Equations (14), (15) and (16) are the individual digit functions. They may be readily derived from a truth table but in words they represent the following. For equation 14, if the addend/augend pair at each BCD weight position is zero, the sum is zero. For equation 15, if either addend or augend bit but not both at weight position 8 is on and if neither bit at weight position 4 is on, 8 is contributed to the sum; or if both bits at weight position 4 are on, eight is contributed to the sum. In either case, if that 8 is added to the situation where both bits are off at weight position 2 but one and only one bit is on at weight position 1, the result is nine. Also, if four is contributed by position 4, and 4 is contributed by position 2 and 1 is contributed by position 1, the result is nine. A similar analysis can be made of equation 16.

Fast Detection Of A Sum Whose Digits Are All Equal To Radix Less 1

The following description is to provide the mathematical basis for those circuits detecting whether a sum of two numbers is comprised of digits each of value one less than the radix, an analysis similar to that just completed for the detection of all ZEROS. As in the ZERO sum detect case, the object is to provide circuits which will detect the radix less 1 condition independently of the sum. Before describing the circuits through which the radix less 1 sum bits are detected in an adder, it is desirable first to describe the mathematics upon which these circuits rest. For purposes of illustration both the circuits and the following mathematics will be restricted to a 32-bit adder although the invention is applicable to adders of any size.

The following mathematical analysis will begin with the binary adder and then will be extended to adders of higher radices, notably decimal.

A. The Binary Adder

Notations herein will correspond to those in the previous description concerning the detection of all ZEROS. For example, Let $A = (A_0, A_1, \ldots, A_{31})$ = addend
$B = (B_0, B_1, \ldots, B_{31})$ = augend
} of a 32-bit adder where the subscripts refer to the bit positions, 0–31, high-to-low-order, respectively.

The half sum H, carry generate G, and carry propagate P functions of the individual bit positions described above, will also be used in the following description with respect to the detection of a 32-bit sum of all ONES. Also, as before, an input carry $C_{in}$ is included among the inputs.

Upon analysis we find that there are three conditions which can produce a sum of all ONES. One of these conditions is where all inputs are ONES (G and $C_{in}$) so that every bit position generates and accepts a carry to produce a sum equal to one.

The second condition in which a sum of all ONES is generated is where one, and only one, bit position has an addend-augend pair equal to zero ($\overline{P}$) thus converting a carry into that particular bit position into a sum equal to one and precluding a carry from that bit position into the next higher order bit position. At the same time the trailing bit position inputs as well as the input carry are all ones so that they produce a trailing sum of one bits and they carry one into the bit position of condition $\overline{P}$. Also, each of the leading bit positions must produce a half sum H that becomes a sum bit of one in the absence of a carry.

The third condition which produces a sum of all ONES is where the carry in is zero and all bit positions produce a half sum H so that no carrys are produced and all bit position sums remain one.

To express the above three conditions mathematically:

$$\begin{aligned}\text{ONES} = &\, G_0 \cdot G_1 \cdot G_2 \ldots G_{31} \cdot C_{in} \\ &+ \overline{P}_0 \cdot G_1 \cdot G_2 \ldots G_{31} \cdot C_{in} \\ &+ H_0 \cdot \overline{P}_1 \cdot G_2 \ldots G_{31} \cdot C_{in} \\ &\vdots \\ &+ H_0 \cdot H_1 \cdot H_2 \ldots \overline{P}_{31} \cdot C_{in} \\ &+ H_0 \cdot H_1 \cdot H_2 \ldots H_{31} \cdot \overline{C}_{in}\end{aligned} \quad (17)$$

Next, the first two terms of equation 17 are combined to yield equation 18 below since $(G_0 + \overline{P}_0) = H_0$.

$$\begin{aligned}\text{ONES} = &\, \overline{H}_0 \cdot G_1 \cdot G_2 \ldots G_{31} \cdot C_{in} \\ &+ H_0 \cdot \overline{P}_1 \cdot G_2 \ldots G_{31} \cdot C_{in} \\ &\vdots \\ &+ H_0 \cdot H_1 \cdot H_2 \ldots \overline{P}_{31} \cdot C_{in} \\ &+ H_0 \cdot H \cdot H_2 \ldots H_{31} \cdot \overline{C}_{in}\end{aligned} \quad (18)$$

The first two terms of equation 18 are combined to yield equation 19, noting that $\overline{H}_0 \cdot H_0 = \overline{P}_1 \cdot G_1 = 0$.

$$\text{ONES} = (\overline{H}_0 + \overline{P}_1) \cdot (H_0 + G_1) \cdot G_2 \ldots G_{31} \cdot C_{in}$$
$$+ H_0 \cdot H_1 \cdot \overline{P}_2 \ldots G_{31} \cdot C_{in}$$
$$\vdots$$
$$+ H_0 \cdot H_1 \cdot H_2 \ldots \overline{P}_{31} \cdot C_{in}$$
$$+ H_0 \cdot H_1 \cdot H_2 \ldots H_{31} \cdot \overline{C}_{in} \quad (19)$$

The process of combining the first two terms is repeated until only a single term remains, as shown in equation 20.

$$\text{ONES} = (\overline{H}_0 + \overline{P}_1 + \ldots + \overline{P}_{31} + \overline{C}_{in}) \cdot (H_0 + G_1) \cdot$$
$$\ldots \cdot (H_{30} + G_{31}) \cdot (H_{31} + C_{in}) \quad (20)$$

A circuit can be built implementing equation 20 and such a circuit would be fast acting. However, an alternate implementation which might take an additional level of logic and, therefore, be somewhat slower but which would need fewer circuits to implement, makes use of the functions generated in the carry look ahead portion of a carry look ahead adder. This alternate implementation makes use of the input carry $C_{out}$ to replace the expression in equation 20

$$(\overline{P}_1 + \ldots + \overline{P}_{31} + \overline{C}_{in}).$$

The output carry can be generated early; i.e., prior to the sum, so that ONES is available concurrently with or earlier than the sum. The alternate equation is:

$$\text{ONES} = (\overline{C}_{out} + G_0) \cdot (H_0 + G_1) \cdot \ldots \cdot (H_{30} + G_{31}) \cdot$$
$$(H_{31} + C_{in}) \quad (21)$$

It is derived as follows; $C_{out}$ can be expressed as in equation 22.

$$\overline{C}_{out} = \overline{P}_0$$
$$+ H_0 \cdot \overline{P}_1$$
$$\vdots$$
$$+ H_0 \cdot H_1 \ldots \overline{P}_{31}$$
$$+ H_0 \cdot H_1 \ldots H_{31} \cdot \overline{C}_{in} \quad (22)$$

Equation 22 is now substituted for each $\overline{P}$ ($\overline{P}_0$, $\overline{P}_1$, etc.) term is equation 20 to yield equation 23. For each substitution of a $\overline{P}_K$ with $\overline{C}_{out}$ only the corresponding term in equation 22 is relevant (i.e., the term containing $\overline{P}_K$); the other terms drop out because $H_K$, $\overline{P}_K$, and $G_K$ are mutually exclusive.

$$\text{ONES} = G_0 \cdot G_1 \cdot G_2 \ldots G_{31} \cdot C_{in}$$
$$+ \overline{C}_{out} \cdot G_1 \cdot G_2 \ldots G_{31} \cdot C_{in}$$
$$+ H_0 \cdot \overline{C}_{out} \cdot G_2 \ldots G_{31} \cdot C_{in}$$
$$\vdots$$
$$+ H_0 \cdot H_1 \cdot H_2 \ldots \overline{C}_{out} \cdot C_{in}$$
$$+ H_0 \cdot H_1 \cdot H_2 \ldots H_{31} \cdot \overline{C}_{out} \quad (23)$$

Equation 23 is now reduced iteratively by combining the first two terms until only a single term remains. That expression is $$\text{ONES} = (\overline{C}_{out} + \overline{H}_0) \cdot (H_0 + G_1) \cdot \ldots \cdot (H_{30} + G_{31}) \cdot$$
$$(H_{31} + C_{in}) \quad (24)$$

where $(\overline{C}_{out} + \overline{H}_0)$ is interchangeable with $(\overline{C}_{out} + G_0)$ since $\overline{C}_{out}$ includes $\overline{P}_0$ and $G_0 + \overline{P}_0 = \overline{H}_0$.

Generally, an adder design produces the single-bit functions, H, P, and G, earlier than $C_{out}$. Equation 24 may therefore be restated as in equation 25 to permit a single level of delay between the production of $C_{out}$ and the detection of ONES.

$$\text{ONES} = \overline{C}_{out} \cdot (H_0 + G_1) \cdot \ldots \cdot (H_{30} + G_{31}) \cdot (H_{31} +$$
$$C_{in}) + \overline{H}_0 \cdot (H_0 + G_1) \cdot \ldots \cdot (H_{30} + G_{31}) \cdot (H_{31} + C_{in}) \quad (25)$$

ONES may also be expressed as a function of some intermediate carry, $C_K$, as follows:

$$\text{ONES} = (\overline{H}_0 + \overline{P}_1 + \ldots + \overline{P}_{k-1} + \overline{C}_K) \cdot (H_0 + G_1) \cdot$$
$$\ldots \cdot (H_{30} + G_{31}) \cdot (H_{31} + C_{in}) \quad (26)$$

B. Extension to Radices > 2

The method for detecting a sum of all ones can be generalized to radices > 2. The corresponding condition is for each sum digit to be equal to radix-less-one when normalized to the lowest integer position (radix$^0$ = 1).

Let r = integer radix ≥ 2
A = (A$_0$, ..., A$_{n-1}$) = addend
B = (B$_0$, ..., B$_{n-1}$) = augend   of an n-digit adder
$C_{in}$ = input carry to adder where the subscripts, 0 through $n-1$, refer to digit positions high-to-low-order, respectively.

The following functions of a digit position, K, will be used:

$(K)_{2(r-1)}$ = the normalized algebraic sum, $(A_K + B_K)$, is equal to 2 $(r-1)$ $(K)_{r-2}$ = the normalized algebraic sum, $(A_K + B_K)$, is equal to 2 $(r-2)$ $(K)_{r-1}$ = the normalized algebraic sum, $(A_K + B_K)$, is equal to $(r-1)$ For binary ($r=2$), the functions $(K)_{2(r-1)}$, $(K)_{r-2}$, $(K)_{r-1}$ correspond to $G_K$, $\overline{P}_K$, $H_K$, respectively.

The conditions for generating a sum all of whose digits are equal to radix-less-one are enumerated in equation 27. The function will be referred to as SDRLO which stands for Sum Digits Radix Less One.

$$\text{SDRLO} = (0)_{2(r-1)} \cdot (1)_{2(r-1)} \cdot (2)_{2(r-1)} \ldots$$
$$(n-1)_{2(r-1)} \cdot C_{in}$$
$$+ (0)_{r-2} \cdot (1)_{2(r-1)} \cdot (2)_{2(r-1)} \ldots (n-1)_{2(r-1)}$$
$$\cdot C_{in}$$
$$+ (0)_{r-1} \cdot (1)_{r-2} \cdot (2)_{2(r-1)} \ldots (n-1)_{2(r-1)}$$
$$\cdot C_{in}$$
$$\vdots \quad (27)$$
$$+ (0)_{r-1} \cdot (1)_{r-1} \cdot (2)_{r-1} \ldots (n-1)_{r-2} \cdot C_{in}$$
$$+ (0)_{r-1} \cdot (1)_{r-1} \cdot (2)_{r-1} \ldots (n-1)_{r-1} \cdot \overline{C}_{in}$$

In words, SDRLO is generated if one of the three conditions is satisfied:

1. In each digit position, the normalized algebraic sum $(A_K + B_K)$ is $2(r-1)$ and $C_{in} = 1$. Each digit position generates a carry with a remainder of $r-2$ which combined with the carry entering the digit produces a final sum of $r-1$.

2. The normalized algebraic sum in one and only one digit position $(A_K + B_K)$ is $r-2$. In each trailing digit position the normalized algebraic sum is $2(r-1)$ which produces a carry; $C_{in} = 1$; and in each leading digit position the normalized algebraic sum is $r-1$. Therefore, the respective carry that enters a trailing digit position as well as the digit position K produces a sum digit of $r-1$. Since no carry is generated in digit position K, the leading digit positions retain sums of $r-1$.

3. $C_{in}$ is 0 and the normalized algebraic sum in each digit position $(A_K + B_K)$ is $r-1$.

The next step is to compress equation 27 by combining the first two terms. That equation is then simplified by the combining of its first two terms and the compression process is continued until the equation reaches a single term which is shown below.

$$SDRLO = [(0)_{2(r-1)} + (0)_{r-2} + \ldots + (n-1)_{r-2} + \overline{C_{in}}]$$
$$\cdot [(0)_{r-1} + (1)_{2(r-1)}] \cdot \ldots \cdot [(n-2)_{r-1} + (n-1)_{2(r-1)}]$$
$$\cdot [(n-1)_{r-1} + C_{in}] \quad (28)$$

A circuit to implement equation 28 may be built to detect SDRLO for any radix.

The alternate implementation which makes use of the output carry, $C_{out}$, or an intermediate carry is not applicable to radices greater than two. The reason is apparent from equation 29 below. For radix = 2, $(K)_{<(r-1)} = (K)_{r-2}$, while for radix $> 2$, $(K)_{<(r-1)} \neq (K)_{r-2}$.

$$\overline{C_{out}} = (0)_{<(r-1)}$$
$$+ (0)_{r-1} \cdot (1)_{<(r-1)}$$
$$\cdot$$
$$\cdot \quad (29)$$
$$\cdot$$
$$+ (0)_{r-1} \cdot (1)_{r-1} \ldots (n-1)_{<(r-1)}$$
$$+ (0)_{r-1} \cdot (1)_{r-1} \ldots (n-1)_{r-1} \cdot \overline{C_{in}}$$

Note that $(K)_{<(r-1)}$ means that the normalized algebraic sum of a digit position $(A_K + B_K)$ is less than $r-1$ with a minimum value of 0.

C. The Decimal Adder

For decimal ($r=10$), equation 28 becomes:

$$SDRLO = [(0)_{18} + (0)_8 + \ldots + (n-1)_8 + \overline{C_{in}}] \cdot [(0)_9$$
$$+ (1)_{18}] \cdot \ldots \cdot [(n-2)_9 + (n-1)_{18}] \cdot [(n-1)_9 + C_{in}] \quad (30)$$

Let $(A_8, A_4, A_2, A_1)$ and $(B_8, B_4, B_2, B_1)$ be the BCD (binary-coded decimal) representation of the addend and augend digits respectively. The subscripts (8, 4, 2, 1) refer to the weight of the respective bits comprising a decimal digit.

Then, $$(K)_9 = \{[(A_8 \veebar B_8) \cdot (\overline{A_4} \cdot \overline{B_4}) + (A_4 \cdot B_4)] \cdot (\overline{A_2} \cdot \overline{B_2})$$
$$+ (A_4 \veebar B_4) \cdot (A_2 \cdot B_2)\} \cdot (A_1 \veebar B_1) \quad (31)$$

$$(K)_8 = \{[(A_8 \veebar B_8) \cdot (\overline{A_4} \cdot \overline{B_4}) + (A_4 \cdot B_4)] \cdot (\overline{A_2} \cdot \overline{B_2})$$
$$+ (A_4 \veebar B_4) \cdot (A_2 \cdot B_2)\} \cdot (\overline{A_1} \cdot \overline{B_1}) + (A_8 \cdot B_8) \cdot (A_4$$
$$\veebar B_4) \cdot (A_2 \veebar B_2) \cdot (A_1 \cdot B_1) \quad (32)$$

$$(K)_{18} = (A_8 \cdot B_8) \cdot (A_1 \cdot B_1) \quad (33)$$

Equations 31, 32 and 33 are the individual digit functions that are readily derived from a truth table. It is assumed that an input digit has a range of values 0–9 and values 10–15 are "don't-care" conditions, i.e., $A_8 \cdot (A_4 + A_2) = B_8 \cdot (B_4 + B_2) = 0$.

Circuit Implementations

A. The Binary Adder

FIG. 1 provides a simplified perspective of a typical prior art 32-bit parallel binary adder with the carry look ahead feature. Note that the augend and addend bits for each bit position are fed as inputs to the adder at the single bit position function circuits illustrated at 10, 11 and 12. The output of these single bit function circuits are the carry generate G, carry propagate P and half sum H functions (pulses) described above. The G and P pulses for each bit position are fed to the carry look-ahead logic circuits, generally designated at 13, for the production of carry pulses. Once produced these carries may be combined with the previously produced half sums to produce the sum of the addend and augend bits at each bit position. A complete explanation of adders with the carry look ahead feature is to be found in the incorporated references and no further discussion of the overall functioning of the adder or the equations on which it is based is necessary at this time. However, FIG. 2 will explain the manner in which single bit functions may be generated using the logic family of circuits known as NAND/AND-DOT.

Referring first to FIG. 2D note that two inputs V and W are fed into a NAND circuit 15 and two inputs X and Y are fed into a second NAND circuit 16, and the outputs of the two circuits 15 and 16 are dotted at 17. The result is $(\overline{V \cdot W}) \cdot (\overline{X \cdot Y})$. This result is obtained since a NAND circuit output represents the ANDing of the input and then inverting the result. Consequently, the output of circuit 15 is $\overline{V \cdot W}$ and the output of circuit 16 is $\overline{X \cdot Y}$. The AND-DOT at 17 is a joining together of the two outputs such that we have the output of circuit 15 AND the output of circuit 16. Another manner of expressing the output is through the application of deMorgan's Rule: $(\overline{V} + \overline{W}) \cdot (\overline{X} + \overline{Y}) = (\overline{V \cdot W + X \cdot Y})$. Unless otherwise labeled or identified, all rectangular blocks in the drawings are NAND/AND-DOT circuits in accordance with FIG. 2D.

Now refer to FIG. 2A which is a circuit showing the generation of the sum at digit K from the inputs $A_K$ and $B_K$. As explained above in the mathematical analysis, the function G is defined as the carry generate of a bit position, the condition in which both A and B are on. Consequently, in a logic circuit such as circuit 18 in FIG. 2A the inputs A and B are ANDed together with a resulting output of G. However, since this is a NAND circuit and not a simple AND circuit the output is inverted and it is $\overline{G}$. As explained above in the definitions of the carry propagate function P, P is the condition found when one or the other bit position is on or both are on, such that a carry into that bit position will be propagated to the next bit position. Therefore the function P can be implemented in NAND/AND-DOT logic by feeding input A into NAND circuit 19 resulting in an output of not A while input B is fed into the NAND circuit 20 resulting in an output of not B. Consequently, the outputs of circuits 19 and 20 together are not A and not B. If these two outputs are ANDed together at DOT 21 the result is the function $\overline{P}$, that is, neither bit is on, and by inverting $\overline{P}$ at inverter circuit 22 the function P is obtained. From the basic functional relationships set forth above, the ANDing of P and $\overline{G}$ provides the function H. That is performed in NAND circuit 23 which since it is a NAND circuit and not a simple AND circuit results in the production of the complement $\overline{H}$. The same ANDing function may be accomplished without the inversion simply by combining the two lines $\overline{G}$ and P together as shown by the grouped conductors 24. The half sum H and the complement of the half sum, $\overline{H}$, may now be combined with the appropriate input carry to form the summation of the addend-augend pair at that digit position in the adder. Again, the expression for this summation is in the prior art and is explained in the incorporated references. Note that to obtain the inversion of the input carry an inverter circuit is used at 25 and note also that the NAND circuits 26 and 27 are DOT ANDed at 28 to produce the sum at digit K.

FIG. 2B is identical to FIG. 2A with one exception. In FIG. 2B the complement of the inputs is used, $\overline{A}_K$, $\overline{B}_K$, and the input carry is also inverted. The result using NAND/AND-DOT logic is the complement of the sum at the digit position.

FIG. 2C is another version of the adder using input carries where both the true input $\overline{A}$ and $\overline{B}$, and the complement A and B, are initially available. The result is a faster adder but there is a need for additional logic circuits in order to take advantage of all of the inputs. A comparison of the three circuits shows that there are five logic levels A, B, C, D and E for the circuits shown in FIGS. 2A and 2B in addition to whatever number of logic levels are necessary to produce the carries over and above the two logic levels already provided, while for the circuit shown in FIG. 2C there are only two logic levels A and B in addition to those extra levels necessary to produce the carries. It is this reduction in logic levels that increases adder speed. Note, however, that five circuits, 18, 19, 20, 22, and 23 were all that were necessary to produce G, P, and H in FIGS. 2A and 2B while ten circuits (all at logic level A) are needed in FIG. 2C.

B. Zero Sum Binary Adder Circuits

FIG. 3 is a circuit implementing equation 4 for the detection of a ZEROS sum. Certain circuit constraints of a practical nature have been embodied in the design of FIG. 3. These circuit constraints are (1) the maximum fan-in is assumed to be 8, (2) the maximum DOTting capability is 8 and (3) the maximum fan-out is equal to 11 minus the number of NANDs in the DOT.

The implementation shown in FIG. 3 makes use of deMorgan's Rule which is to the effect that the OR of two functions is equal to the inverse of the ANDing of the complement of the two functions. Consequently, the input signals shown at the first level of logic in FIG. 3 represent the complements of the functions shown in equation 4 so that the OR functions shown in equation 4 are converted to AND functions for the NAND logic family in use to implement this invention. Since the maximum fan-in to a logic circuit according to the circuit constraints defined above is 8, 8 inputs are shown to logic circuit 100, 8 to logic circuit 101, 8 to 102 and 8 to 103. Were a logic circuit available with a fan-in that could handle all of the inputs, a single block signifying such a logic circuit could replace the four blocks 100 through 103.

Similarly, at the first logic level A, the pulses $\overline{H}_0$ and $P_1$ are combined in NAND circuit 104. NAND circuit 105 contains as inputs $\overline{H}_1$ and $P_2$. Similar NAND circuits not shown are provided for each of the 32 factors in equation 4 of the H and P combination. The last factor in the chain has as inputs $\overline{H}_{31}$ and $C_{in}$ which are shown feeding NAND circuit 136.

According to equation 4 the output of each of the H and P ANDs are ORed together. Consequently, the output of each of the H and P NAND circuits (which is inverted) must be ANDed together and this may be done in DOT fashion such as shown in DOTs 137, 138, 139, 140, 141 and 142. While maximum DOTting according to the circuit design constraints above is 8, maximum DOTting cannot be used in this circuit at this point since the third constraint tells us that the maximum fan-out is equal to 11 minus the number of NANDs in the DOT. We note from the second logic level B that the fan-in must equal 5 since there are 5 NAND circuits in that level. Consequently, the maximum DOTting which can be used is 6 according to the third circuit restraint. At the second logic level NAND circuits 143, 144, 145, 146 and 147 provide an ANDing signal for the inverse of what was to be ORed in equation 4. Note at each NAND circuit 143–147 contains 7 inputs, thus satisfying the first circuit constraint defined above. The output of circuits 143–147 is then ANDed together to produce the ZEROS sum except that since circuits 143 through 147 are NAND circuits the result is an inverted ZEROS sum. Thus, a circuit has been provided to implement equation 4 and it should be noted that the production of the ZEROS sum is totally independent of the carry look ahead feature of the adder. Once the individual bit position pulses H and G have generated it takes only two additional logic levels to detect a summation which results in all zeros. This detecting operation can be accomplished while the carry-look-ahead circuits are generating carries and thus the detection will be completed before the final summation is made.

FIG. 4 is an alternative implementation for detecting the ZEROS sum and is based on equation 9 which makes use of the carry look ahead feature of the adder, specifically making use of the final carry, $C_{out}$. Such a circuit provides the least number of additional logic circuits necessary for inclusion in an adder to implement the early detection of a ZEROS sum according to the invention herein. A comparison of this logic to the number of logic circuits in FIG. 3 illustrates the simplified nature of the circuit found in FIG. 4. However, there is additional delay in detecting the ZEROS sum when using the circuit of FIG. 4 since the ZEROS sum cannot be obtained until the input signal $C_{out}$ is finally obtained in the carry look ahead portion of the adder. In FIG. 4, the detection of a ZEROS sum occurs one logic level after the production of $C_{out}$ and therefore would occur simultaneously with the summation of A, B and carry bits in the parallel binary adder shown in the incorporated references.

The $\overline{H}$ and P inputs of equation 9 are ANDed by NAND circuits 150 as shown at logic level A in FIG. 4. This factor is then ANDed with $C_{out}$ in circuit 151 and ANDed with $\overline{H}_0$ in circuit 152 at logic level B. The two factors are then ANDed at Dot 153 producing the complement of the ZEROS sum. Again, NAND/AND-DOT logic has been used with the circuit constraints mentioned above.

FIG. 5 provides still another alternative implementation for detecting the ZEROS sum. The circuits shown in FIG. 5 is based on equation 10 above where the carry look ahead feature of the adder is used in obtaining the ZEROS sum, but instead of using $C_{out}$ some intermediate carry signal is used. Actually any intermediate carry can be used but in the particular implementation shown in FIG. 5, the carry into the 24th bit of the 32-bit adder has been used. The purpose of using an intermediate carry is to obtain a detection of the ZEROS sum sooner than would be possible if it were necessary to wait for the production of $C_{out}$. This may be readily observed with respect to the incorporated reference entitled "A One Microsecond Adder Using One Megacycle Circuitry." Refer to FIG. 10 of that reference, and it is obvious that in that particular circuit the carry bits at the four low order positions are generated at a logic level earlier than any other of the carry bits. In the incorporated reference the next 16 low order carry bits are generated at a next logic level and finally the remaining carry bits for that particular adder. Using the circuit technology in which the instant invention has been explained, the low order seven carry bits would be obtained on the first clock cycle (logic level) of the carry look ahead portion of the adder since the circuit constraint herein has a maximum fan-in of 8 lines. Consequently, $C_{24}$ would be produced on the very first logic level of the carry look ahead operation. For that reason $C_{24}$ has been chosen as the intermediate carry pulse to be used in the circuit implementation shown in FIG. 5. Again, however, any intermediate carry could be used. Note that the circuit of FIG. 5 uses fewer logic circuits than the implementation of FIG. 3, but uses considerably more logic than the circuit of FIG. 4. Generally, the use of the $C_{out}$ pulse provides the least logic, the use of only the $C_{in}$ pulse requires the most logic and the use of an intermediate carry pulse will be inbetween. Conversely, the use of only the $C_{in}$ pulse provides the fastest circuit, the use of the $C_{out}$ pulse the slowest circuit and the use of an intermediate carry pulse somewhere inbetween.

In FIG. 5 note that the combination of H and P pulses is made in logic circuits 160 while the combination of H and G pulses is made in circuits 161. These are then ANDed together in circuits 162 together with the intermediate carry pulse $C_{24}$. The final AND is made at DOT 163 for detecting the $\overline{ZEROS}$ summation.

C. SDRLO Circuits For The Binary Adder

FIGS. 6, 7 and 8 follow the same rationale for the early detection of SDRLO that was just discussed above with respect to FIGS. 3, 4 and 5 relating to the early detection of a ZEROS sum. FIG. 6 relates to FIG. 3, FIG. 7 relates to FIG. 4 and FIG. 8 relates to FIG. 5.

In FIG. 6 equation 20 has been implemented for the early detection of a sum of all ONES in the binary adder. Again, NAND/AND-DOT logic has been used with the same circuit constraints that were identified above relating to fan-in, fan-out and DOTting. In FIG. 6 the H and P pulses representing the H and P factors of equation 20 are ANDed together in four NAND logic circuits 170. The $\overline{H}$ and $\overline{G}$ pulses together with the $\overline{C}_{in}$ signals are ANDed together in the 32 NAND logic circuits shown at 171. The outputs of the circuits 170 and 171 are then ANDed together in five NAND logic circuits 172, and the final AND is made at DOT 173 for the detection of $\overline{ONES}$. Note, for NAND circuits 170 a maximum fan-in of 8 inputs is provided. Since there are 5 logic circuits 172 to handle the outputs of logic circuits 170 together with $\overline{C}_{in}$, a fan-out of 5 is required from logic circuits 171. With that requirement the maximum allowed DOTting for circuits 171 is 6.

FIG. 7 shows an implementation of the circuit for detecting SDRLO when $C_{out}$ is used according to equation 25. Again, this circuit is much simpler than the previous circuit but is slower since the final AND cannot be accomplished until the $C_{out}$ pulse has been obtained through the operation of the carry look ahead circuits. Since the discussion of this circuit follows that for FIG. 4, no further description is needed here.

FIG. 8 shows an implementation of equation 26 where an intermediate carry pulse has been utilized in the formation of SDRLO. In this case $C_{24}$ has been chosen so that FIG. 8 will coincide with that already described in FIG. 5. As a result, no further discussion of FIG. 8 is needed.

D. Circuits For Any Radix

FIG. 9 is a typical $n$-digit radix-$r$ parallel adder with carry look ahead. FIG. 9 is similar to FIG. 1 which was a parallel adder with carry look-ahead for the binary case. For example, the inputs to the adder, the augend A and the addend B, are shown entering the digit function circuits 10', 11' and 12' and the circuits which implement these digit functions are similar to the single bit function circuits 10, 11 and 12 of FIG. 1. However, for a generalized radix the functions (pulses) are expressed as shown at 30, 31 and 32 (for the high order digit) instead of the simple G, P and H binary functions. Digit pulses 30 and 31 (for all digit positions) are fed to the carry look ahead circuits of the adder in a similar manner to G and P in FIG. 1. The output of the carry look ahead circuits 13' are the carry pulses for each digit position. They are fed back to the summation circuits for each digit position to produce the final sum in a manner similar to that of FIG. 1.

Figure 10:
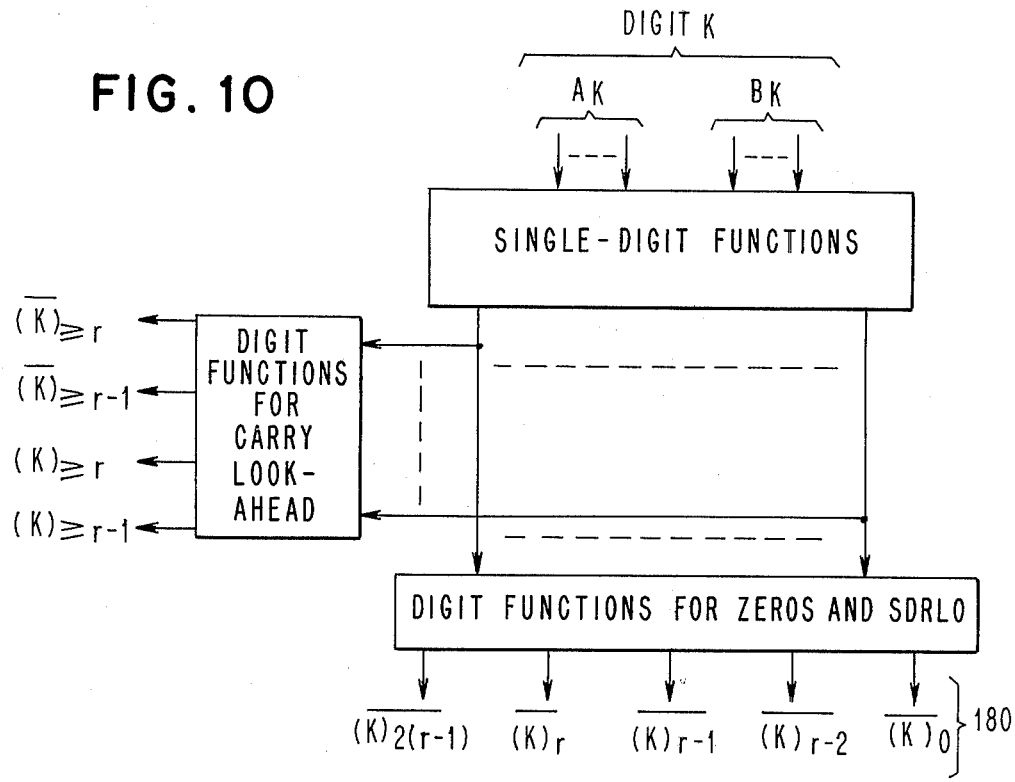
FIG. 10 is an adder for the radix $r$ showing the digit function generation necessary for detecting zeros and radix less 1 summations prior to the actual addition.

FIG. 10 is a generalized radix representation of the adder of FIG. 9 with the additional circuits necessary for detecting a sum of ZEROS and a sum of digits of the radix less 1. Note that the carries from the carry look ahead circuits are not used to detect the ZEROS condition or the radix less 1 condition. The five functions (pulses) needed are shown at 180. Of these functions, the zero function at the Kth digit is used in the detection of the ZEROS sum together with the $r$ function at the Kth digit and the $r - 1$ function at the Kth digit. For detecting the $r - 1$ sum at all digits, the function $r - 2$ for the Kth digit, the function $2(r - 1)$ for the Kth digit and the function $r - 1$ for the Kth digit are all needed. Thus, the function $r - 1$ at the Kth digit is common to both detection circuits.

Figure 11:
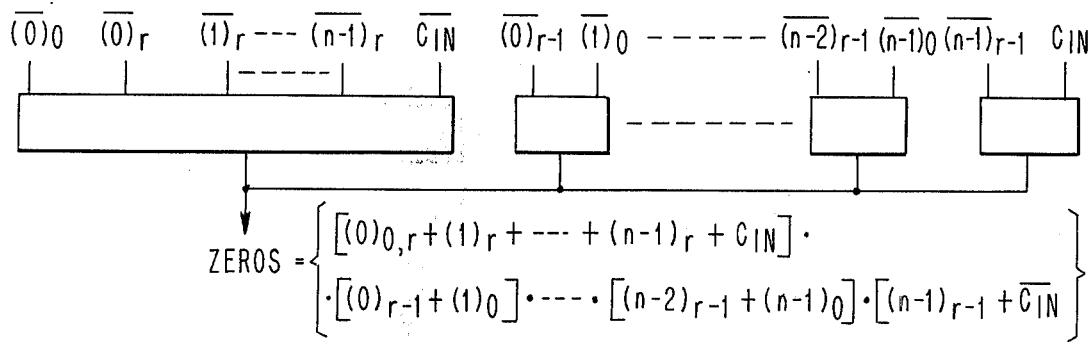
FIG. 11 is a logic circuit for operating on the digit functions produced in FIG. 10 to obtain a ZEROS detection.

FIG. 11 shows the circuits needed to implement equation 12 to detect the ZEROS sum for the case of a generalized radix using as inputs the three needed pulses generated at 180 in FIG. 10.

Figure 12:
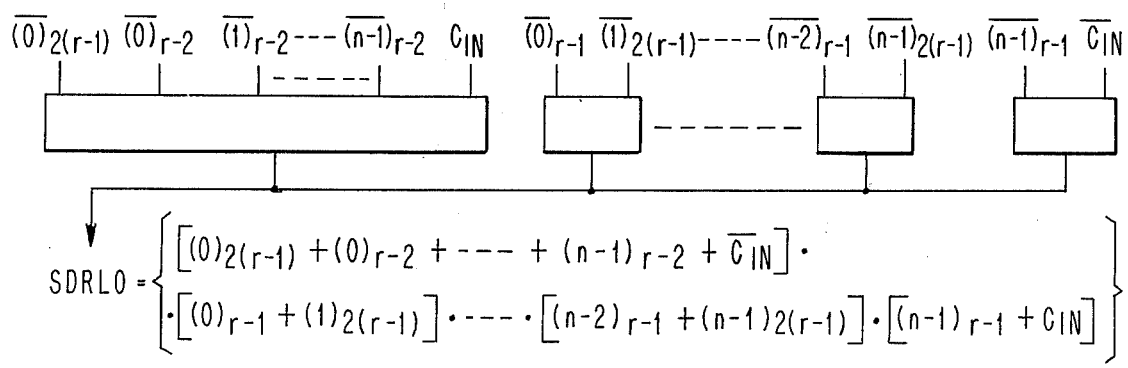
FIG. 12 is similar to FIG. 11 for the detection of a summation of the radix less 1.

FIG. 12 shows the circuits necessary to implement equation 28 for the SDRLO sum and is similar to FIG. 11 for the ZEROS sum case using the three needed inputs generated at 180 in FIG. 10. FIGS. 10, 11 and 12 are designed with NAND/AND-DOT logic as are all other circuits herein.

E. The Decimal Adder

Figure 13:
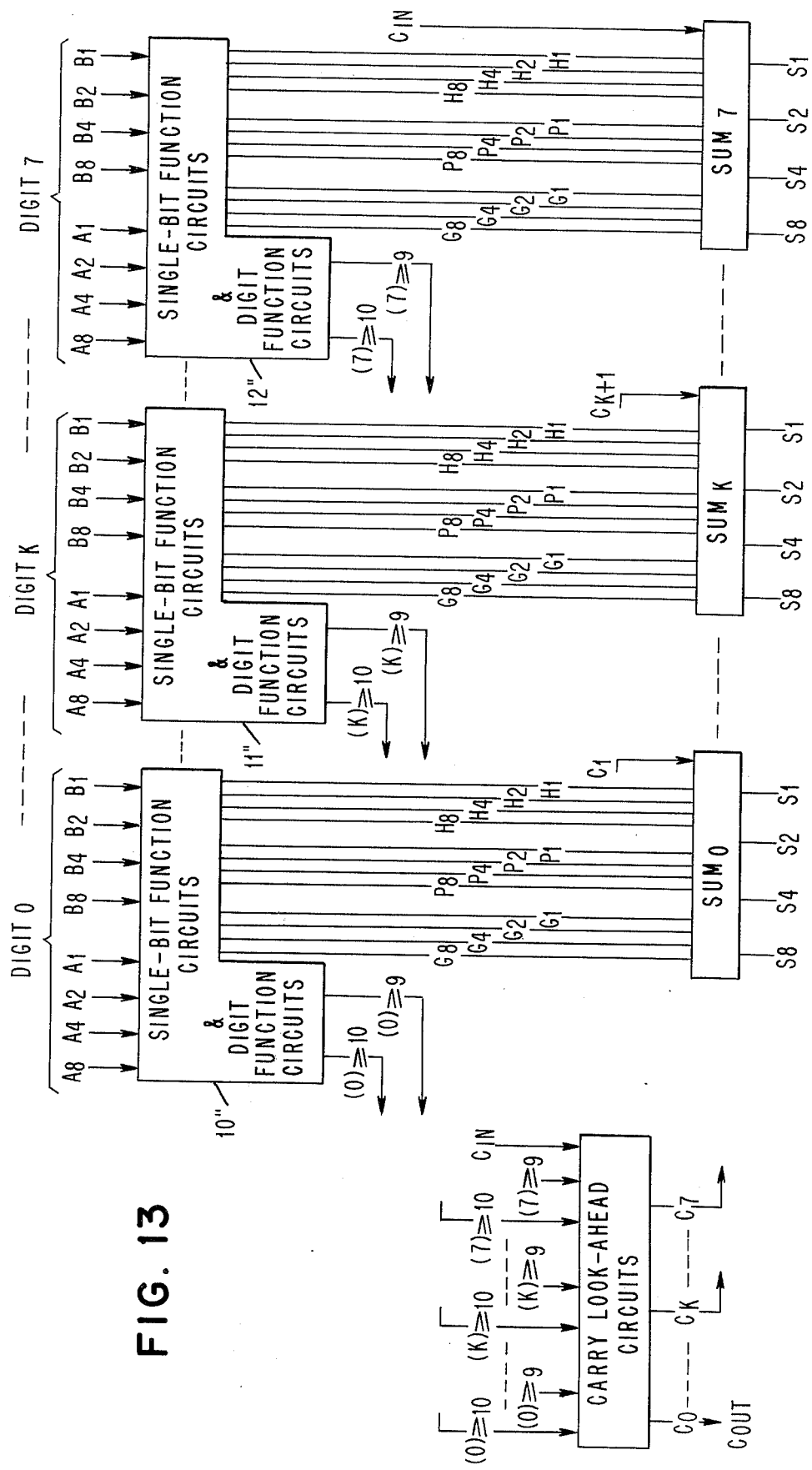
FIG. 13 is similar to FIG. 1 and shows a typical decimal adder with carry look ahead.

FIG. 13 is a diagram of a typical prior art 8 digit (32-bit) parallel decimal adder with carry look ahead. The single bit function circuits and digit function circuit are shown at 10'', 11'' and 12''. The inputs to these circuits for each decimal digit comprise the 4 bits of an augend representation and the 4 bits of an addend representation using the BCD (binary coded decimal) representation of the decimal digit. Circuits for implementing such an adder are found in the incorporated references.

Figure 14:
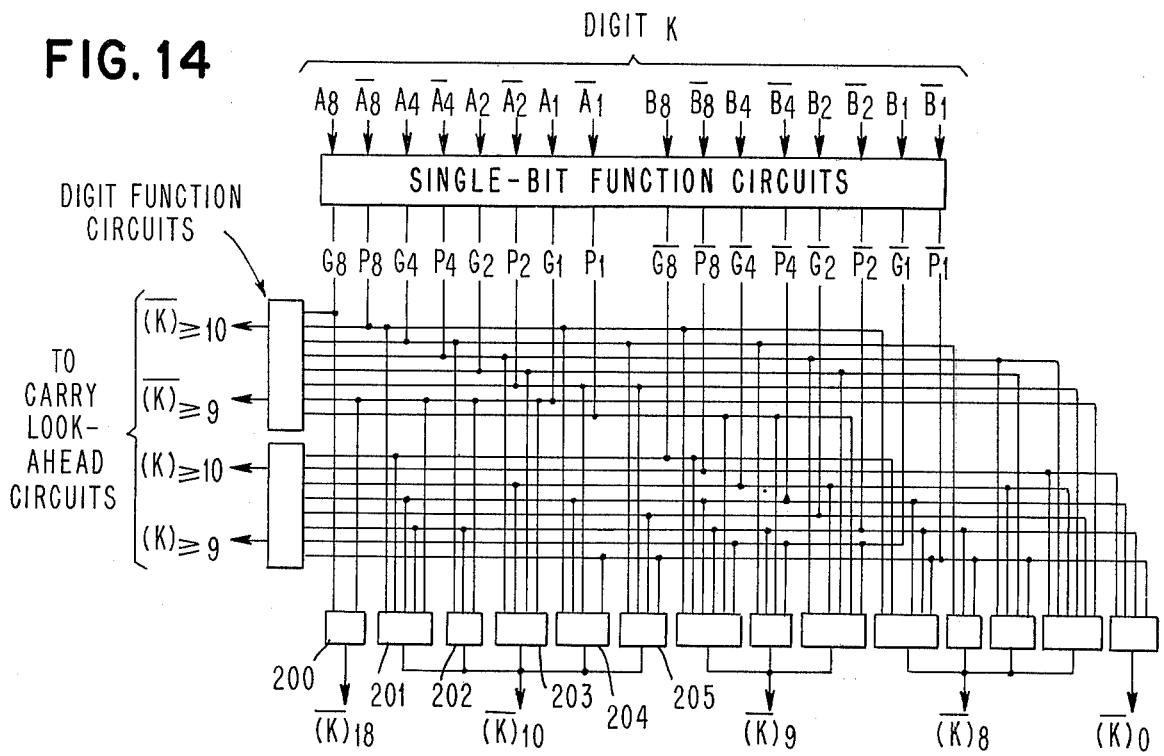
FIG. 14 shows circuits to derive the digit functions necessary to detect a summation of all ZEROS and all NINES.

FIG. 14 shows the circuits which must be incorporated in a parallel decimal adder using NAND/AND-DOT logic to produce needed functions for detecting a sum of all ZEROS and a sum of all NINES (SDRLO for $r = 10$). To understand this circuit, note that since the decimal function of the Kth digit for $2(r-1)$ represents a test for the value 18, and since the G function represents the condition where both addend and augend bits are on, the G pulse for the order 8 in a BCD representation represents the condition in which both the addend and the augend contain the digit 8. If that is added to the condition in which both the addend and augend bits representing 1 are on, that is the G pulse for the order 1, the summation of the $G_8$ pulse and the $G_1$ pulse is $8 + 8 + 1 + 1$ which is 18. Thus, the NAND circuit at 200 which ANDs $G_8$ and $G_1$ tests for the presence of 18 at the Kth digit.

In FIG. 14, it is next desired to test for the value 10 at the digit K. Ten can be produced in various fashions, 5 to be exact, through the combination of BCD orders of addend and augend bits. For example, 10 can be reached by detecting both the P pulse and the $\overline{G}$ pulse for the order 8 which represents the condition in which either the addend or the augend bit is on but not both. If one of the two bits is on an input of 8 is represented by that bit. If an input of 8 ($P_8 \cdot \overline{G}_8$) is added to an input of 2 the result is 10. Two is represented by the pulse $G_1$ since $G_1$ represents the condition in which the addend and the augend each contribute 1 in the first order position. At the same time, orders 4 and 2 contribute 0 which can be detected by $\overline{P}_4$ and $\overline{P}_2$. The $P_8 \cdot \overline{G}_8 \cdot \overline{P}_4 \cdot \overline{P}_2 \cdot G_1$ condition would be tested for in logic circuit 201.

Another possibility for reaching the value 10 is to AND the 8 provided by the pulse $P_8$ with the pulse $P_2$ which would represent a contribution of 2 by either the addend or the augend at the order 2 position. (Note that the AND $P_8 \cdot P_2$ means that at least one bit in order 8 as well as in order 2 are on. This also implies that not more than one bit in order 8 as well as in order 2 is on, because a decimal digit cannot exceed a value of 9, i.e. it cannot have an order 8 bit on simultaneously with an order 4 or an order 2). Orders 4 and 1 contribute 0 as detected by $\overline{P}_4$ and $\overline{P}_1$. The condition $P_8 \cdot \overline{P}_4 \cdot P_2 \cdot \overline{P}_1$ is tested for in logic circuit 204.

Another two possibilities for reaching the value 10 are as follows. Both bits are on in the 4th order which represents a contribution of 4 from both the addend and the augend, thus, a total of 8. This function is represented by the pulse $G_4$. The 8 would be added to a 2 to achieve the value 10. The 2 can come from either order 1 alone ($G_1$) while $\overline{P}_2$ contributes 0 or from order 2 along ($P_2 \overline{G}_2$) while $\overline{P}_1$ contributes 0. (Again note that $G_4$ being on implies $\overline{P}_8$ being on due to the fact that a decimal digit cannot exceed 9). These conditions, $G_4 \cdot \overline{P}_2 \cdot G_1 + G_4 \cdot P_2 \cdot \overline{G}_2 \cdot \overline{P}_1$ are tested for by logic circuits 202 and 205 respectively.

The 5th possibility for reaching a value 10 is for a contribution of 4 from the fourth order, $P_4 \cdot \overline{G}_4$, a contribution of 4 from the second order, $G_2$, AND a contribution of 2 from the first order, $G_1$. Again $G_2$ implies $\overline{P}_8$. The condition $P_4 \cdot \overline{G}_4 \cdot G_2 \cdot G_1$ is tested for in logic circuit 203. In a similar manner the functions for the Kth digit where the value is 9, where the value is 8 and where the value is 0 are tested for as shown in FIG. 14 and as will now be set forth in equation form.

Below, is a table of equations representing the conditions at which the 5 needed functions are found. It is from this table that the circuit of FIG. 14 is derived.

Figure 15:
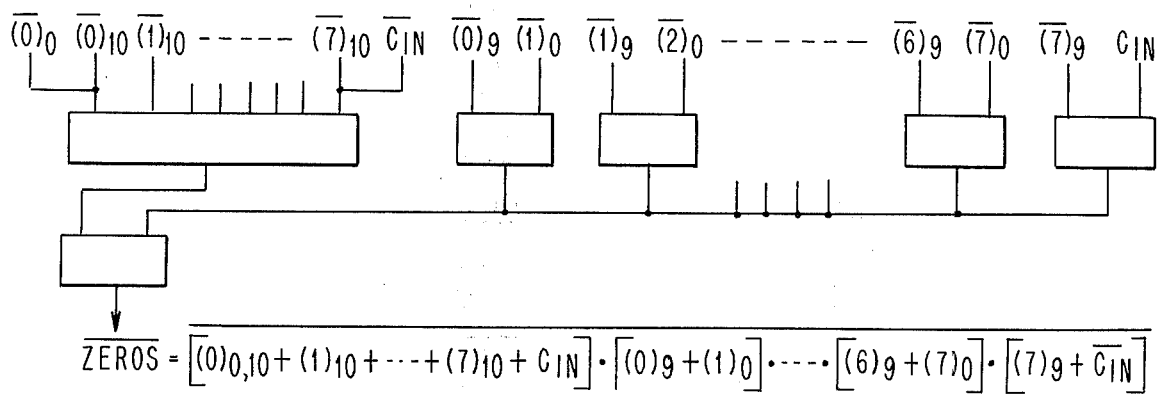
FIG. 15 shows logic circuits which operate on the functions produced in FIG. 14 to detect a summation of all ZEROS.

$(K)_0 = \overline{P}_8 \cdot \overline{P}_4 \cdot \overline{P}_2 \cdot \overline{P}_1$ $(K)_9 = P_8 \cdot \overline{G}_8 \cdot \overline{P}_4 \cdot \overline{P}_2 \cdot P_1 \cdot \overline{G}_1 + G_4 \cdot \overline{P}_2 \cdot P_1 \cdot \overline{G}_1 + P_4 \cdot \overline{G}_4 \cdot G_2 \cdot P_1 \cdot \overline{G}_1$ $(K)_{10} = P_8 \cdot \overline{G}_8 \cdot \overline{P}_4 \cdot \overline{P}_2 \cdot G_1 + G_4 \cdot \overline{P}_2 \cdot G_1 + P_4 \cdot \overline{G}_4 \cdot G_2 \cdot G_1 + P_8 \cdot \overline{P}_4 \cdot P_2 \cdot \overline{P}_1 + G_4 \cdot P_2 \cdot \overline{G}_2 \cdot \overline{P}_1$ $(K)_8 = P_8 \cdot \overline{G}_8 \cdot \overline{P}_4 \cdot \overline{P}_2 \cdot \overline{P}_1 + G_4 \cdot \overline{P}_2 \cdot \overline{P}_1 + P_4 \cdot \overline{G}_4 \cdot G_2 \cdot \overline{P}_1 + \overline{P}_8 \cdot P_4 \cdot \overline{G}_4 \cdot P_2 \cdot \overline{G}_2 \cdot G_1$ $(K)_{18} = G_8 \cdot G_1$ In FIG. 15 equation 13 is implemented in which the detection of a ZEROS sum is generated for the decimal case. FIG. 15 represents an 8 digit adder and uses NAND/AND-DOT logic with the circuit constraints previously noted. The functions necessary for the detection of a sum of all zeros are the functions for the value zero, the value 10 and the value 9. These functions are input to FIG. 15 from the circuit of FIG. 14.

Figure 16:
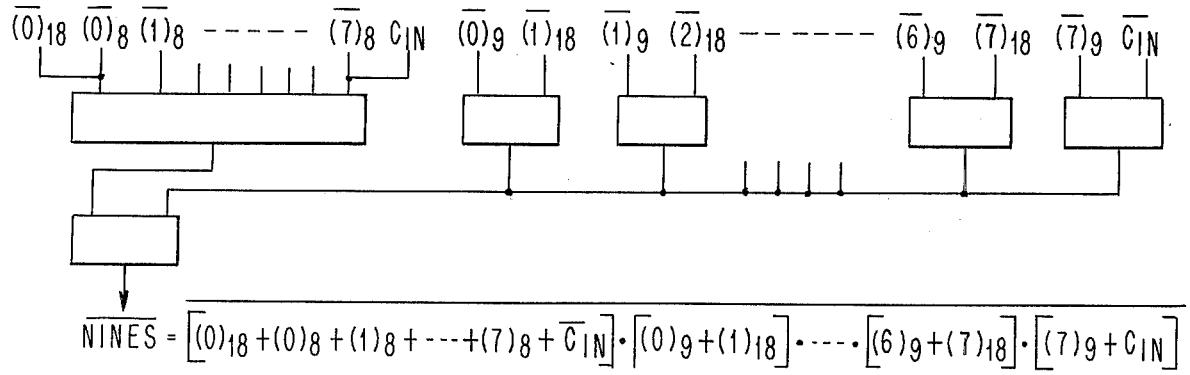
FIG. 16 is similar to FIG. 15 for the detection of all NINES.

FIG. 16 is an implementation of equation 30 for the detection of all NINES. Again, the needed functions produced in FIG. 14 are fed as inputs into the circuits of FIG. 16. The functions necessary for the detection of a sum of all NINES are the function for the value 18, for the value 8 and for the value 9.

F. An Alternative Decimal Adder Circuit

Figure 17:
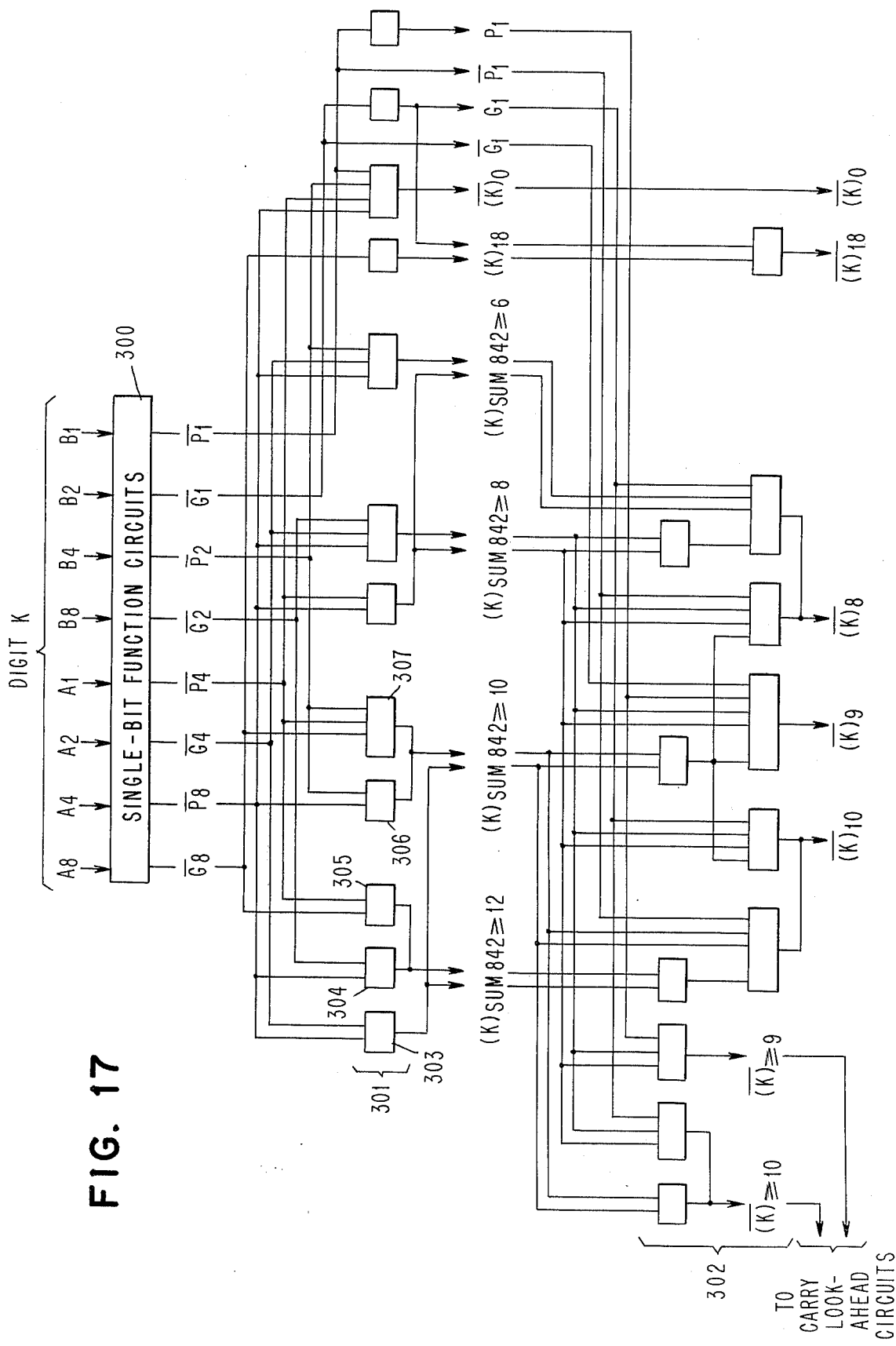
FIG. 17 is an alternative implementation to FIG. 14.

FIG. 17 shows an alternative implementation for the decimal case. This circuit is designed with fewer logic circuits than the circuit shown in FIGS. 14, 15 and 16. The object of the design in FIG. 17 is to make use of commonality in the production of the digit functions which are necessary for the carry look ahead circuits and the digit functions which are necessary for the detection of a sum of all ZEROS and a sum of all NINES. While the generated carries are not of help in simplifying the circuitry for detecting all ZEROS or all NINES for a decimal adder, FIG. 17 does reduce the number of logic circuits necessary to detect those sums by making use of the common need for generating certain functions necessary in the production of generated carries and in the detection of all ZEROS or all NINES. In that manner certain logic circuits can do a double job and the need for separate circuits, one for the carry look ahead and one for the detection of a sum of digits is avoided. The method by which this is accomplished is to divide the digit functions into a summation of the three high order bits, the 8, 4 and 2 bits, separate from the summation of the low order bit.

FIG. 17 shows the true inputs of both addend and augend bits to the single bit function logic circuits 300. Only the true form or the complement form of the single bit functions is needed, and in the illustration the complement functions $\overline{G}$ and $\overline{P}$ have been chosen as an example.

At the next logic level circuits 301, the first group of three NAND circuits 303, 304 and 305 generate the digit function where the sum of the 8, 4 and 2 bits is equal to or greater than 12. The second group of two logic circuits 306 and 307, together with circuit 302, at level 301 produce a digit function whose summation of the three high order bits is equal to or greater than 10. The next two logic circuits at level 301 generate a digit function whose sum of the three high order bits is equal to or greater than 8. The fourth logic circuit group at level 301 generates a digit function whose sum of the three high order bits is equal to or greater than 6. Additional functions generated at level 301 are: a digit function whose sum of all bits is equal to 18, a digit function whose sum of all bits is equal to 0, and the complemented functions, $G_1$ and $P_1$.

At the next logic level 302 these functions are now used to generate the digit functions necessary as inputs to the carry look ahead circuits and the digit functions necessary as inputs for the detection of all NINES and all ZEROS.

The logic circuits which are shown in FIG. 17 are an implementation of the equations below:

$$(K)_{\geq 10} = (K)_{sum_{842} \geq 10} + (K)_{sum_{842} \geq 8} \cdot G_1 \quad \text{for carry look-ahead} \quad (34)$$

$$(K)_{\geq 9} = (K)_{sum_{842} \geq 8} \cdot P_1 \quad (35)$$

$$(K)_{18} = G_8 \cdot G_1$$

$$(K)_{10} = \overline{\{(K)_{sum_{842} \geq 12}\}} \cdot (K)_{sum_{842} \geq 10} \cdot \overline{P_1} +$$
$$\overline{\{(K)_{sum_{842} \geq 10}\}} \cdot (K)_{sum_{842} \geq 8} \cdot G_1 \quad (36)$$

$$(K)_9 = \overline{\{(K)_{sum_{842} \geq 10}\}} \cdot (K)_{sum_{842} \geq 8} \cdot P_1 \cdot \overline{G_1} \quad (37)$$

$$(K)_8 = \overline{\{(K)_{sum_{842} \geq 10}\}} \cdot (K)_{sum_{842} \geq 8} \cdot \overline{P_1} +$$
$$\overline{\{(K)_{sum_{842} \geq 8}\}} \cdot (K)_{sum_{842} \geq 6} \cdot G_1 \quad (38)$$

$$(K)_0 = \overline{P_8} \cdot \overline{P_4} \cdot \overline{P_2} \cdot \overline{P_1}$$

where $$(K)_{sum_{842} \geq 12} = G_8 + P_8 \cdot P_4 + G_4 \cdot G_2 = (P_8 + G_4) \cdot (P_8 + G_2) \cdot (G_8 + P_4) \quad (39)$$

$$(K)_{sum_{842} \geq 10} = G_8 + P_8 \cdot (P_4 + P_2) + G_4 \cdot P_2 = (P_8 + G_4) \cdot (P_8 + P_2) \cdot (G_8 + P_4 + P_2) \quad (40)$$

$$(K)_{sum_{842} \geq 8} = P_8 + G_4 + P_4 \cdot G_2 = (P_8 + P_4) \cdot (P_8 + G_4 + G_2) \quad (41)$$

$$(K)_{sum_{842} \geq 6} = P_8 + G_4 + P_4 \cdot P_2 = (P_8 + P_4) \cdot (P_8 + G_4 + P_2) \quad (42)$$

As an example of the logic expressed by these equations note that for equation 39, where the function of the digit position $K$ is to have a sum of the 8, 4 and 2 order bits equal or to greater than 12, the only three conditions which satisfy that digit condition are (1) where both bits in the 8 order position are on which provides a contribution of 16; (2) where one bit in the 8 bit position is on providing a contribution of 8 and one bit from the 4 order position is on providing a contribution of 4; and (3) where both bits at the 4 order position are on thus providing contribution of 8 and both bits at the two bit position are on providing a contribution of 4. These are the only three conditions which meet the requirement and that is what is expressed by equation 39. It should be noted that $P_8 \cdot G_2$ is an impossibility since a decimal digit can never exceed nine and the above expression implies a ten at either an augend or an addend digit. While a similar explanation in words for the production of the other digit sums, equations 40, 41 and 42, can be made, the above should serve as an adequate example.

Having the threshold digit functions shown in equations 39, 40, 41 and 42 it is now possible to generate the functions necessary for the carry look ahead circuit as shown by equations 34 and 35. In equation 34 note that if the summation of the high order three bits provides a contribution of at least 10 the digit function equal to or greater than 10 will, of course, be generated. Note also that if the upper three bits contribute at least 8 and the low order bit contributes 2 the digit function has also been satisfied. Equation 35 for production of a digit function equal to or greater than 9 is found if the sum of the high order three bits is equal to or greater than 8 and at least one is contributed by the low order position.

Similarly, equations can be written for the production of those single digit functions which are necessary for the detection of ZEROS and NINES. For example, where the digit function is to be equal to 10 that may be found by equation 36 which tells us that if the contribution from the three high order positions is less than 12 but at least equal to 10, and the contribution from the low order digit function is 0, all conditions for the single digit function equal to 10 are met. Equation 36 also shows that 10 is found if the contribution of the digit function from the three high order bits is less than 10 but at least equal to 8, and the contribution from the low order position is 2, the digit function equal to 10 is found. The same analysis may be followed for equations 37 and 38 demonstrating how the production of the functions for the three high order bits provide inputs for the determination of the function for the digit equals 9 and the determination of the function for the digit equals 8. Again, the circuits for implementing these equations are in FIG. 17.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A logic system for determining a binary sum of all zeros which makes use of the half-sum (H), carry propagate (P) and carry generate (G) pulses of each bit position in said sum together with a low order input carry signal $C_{in}$, comprising
    first logic circuit means for combining H and G pulses, second logic circuit means for combining H, P and $C_{in}$ pulses, and third logic circuit means for combining the outputs of said first and second logic circuit means and said input carry signal $C_{in}$, said first, second and third logic circuit means connected to receive and combine pulse inputs according to $$\text{ZEROS} = (\overline{H}_0 + G_1 + \ldots G_{n-1} + C_{in}) \cdot (H_0 + \overline{P}_1) \cdot \ldots (H_{n-2} + \overline{P}_{n-1}) \cdot (H_{n-1} + \overline{C}_{in})$$

where the subscripts 0 to $n-1$ refer to bit positions, high to low order, respectively, in an $n$-bit sum.

2. A logic system for detecting a binary sum of all zeroes which makes use of the half-sum (H) and carry propagate (P) pulses of each bit position in said sum together with a low order input carry signal $C_{in}$ and the high order output carry signal $C_{out}$, comprising
    first logic circuit means for combining H, P and $C_{in}$ pulses, second logic circuit means for combining the outputs of said first logic circuit means with the $C_{out}$ signal, said first and second logic circuit means connected to receive and combine pulse inputs according to $$\text{ZEROES} = \underline{C_{out}} \cdot (H_0 + \overline{P}_1) \cdot \ldots \cdot (H_{n-2} + \overline{P}_{n-1}) \cdot (H_{n-1} + \overline{C}_{in}) + \overline{H}_0 \cdot (H_0 + \overline{P}_1) \cdot \ldots \cdot (H_{n-2} + \overline{P}_{n-1}) \cdot (H_{n-1} + \overline{C}_{in})$$

where the subscripts 0 to $n-1$ refer to bit positions, high to low order, respectively, in an $n$-bit sum.

3. A logic system for detecting a binary sum of all zeroes which makes use of the half-sum (H), carry propagate (P) and carry generate (G) of each bit position in said sum together with a low order input carry signal $C_{in}$ and an intermediate order output carry signal $C_K$, comprisng first logic circuit means for combining H and G pulses, second logic circuit means for combining the outputs of said first and second logic circuit means and said carry signal $C_K$, said first, second and third logic circuit means connected to receive and combine inputs according to $$\text{ZEROES} = (H_0 + G_1 + \ldots G_{K-1} + C_K) \cdot (H_0 + \overline{P}_1) \cdot (H_1 + \overline{P}_2) \cdot \ldots \cdot (H_{n-22} + \overline{P}_{n-1}) \cdot (H_{n-1} + \overline{C}_{in})$$

where the subscripts 0 to $n-1$ refer to bit positions, high to low order, respectively, in an $n$-bit sum.

4. A logic system for detecting a sum of all zeroes where the addend and augend digits are numbers to the same radix $r$, first logic circuit means for producing a set of three pulses for each digit position in said sum, the first pulse indicative of a summation of the addend-augend pair equal to zero, the second pulse indicative of a summation of the addend-augend pair equal to the radix less one, and the third pulse indicative of a summation of the addend-augend pair equal to the radix, second logic circuit means for combining said first pulse of the first digit position and said third pulse for each digit position together with a low order input carry signal $C_{in}$, third logic circuit means for combining said first and second pules of the digit positions together with said signal $C_{in}$, fourth logic circuit means for combining the outputs of said second and third logic circuit means, said four logic circuit means connected according to $$\text{ZEROES} = [(0)_{o,r} + (1)_r + \ldots + (n-1)_r + C_{in}] \cdot \\ [(0)_{r-1} + (1)_0] \cdot \ldots \cdot [(n-2)_{r-1} + (n-1)_0] \cdot \\ [(n-1)_{r-1} + \overline{C}_{in}]$$

where $n-1$ refers to the low order digit position in an $n$-digit sum.

5. A logic system for detecting a decimal sum of all zeroes comprising first logic circuit means for producing a set of three pulses for each digit position in said sum, the first pulse indicative of a summation of the addend-augend pair equal to zero, the second pulse indicative of a summation of the addend-augend pair equal to nine, and the third pulse indicative of a summation of the addend-augend pair equal to ten, second logic circuit means for combining said first pulse of the first digit position and said third pulse for each digit position together with a low order input carry signal $C_{in}$, third logic circuit means for combining said first and second pulses of the digit positions together with said signal $C_{in}$, fourth logic circuit means for combining the outputs of said second and third logic circuit means, said logic circuit means connected according to $$\text{ZEROES} = [(0)_{0,10} + (1)_{10} + \ldots + (n-1)_{10} + C_{in}] \cdot \\ [(0)_9 + (1)_0] \cdot \ldots \cdot [(n-2)_9 + (n-1)_0] \cdot [(n-1)_9 + \overline{C}_{in}]$$

where $n-1$ refers to the low order digit position in an $n$-digit decimal sum.

6. The logic system according to claim 5 where each decimal digit in said addend is represented in BCD form by four bit signals and where each augend digit is represented in BCD form by four bit signals, said bit signals indicating the quantities 8, 4, 2 and 1 respectively, wherein said first logic circuit means is comprised of a fifth logic circuit means for producing the carry propagate (P), and carry generate (G) pulses for each bit in the BCD summation, and a sixth logic circuit connected to said fifth circuit means for combining said G and P pulses to produce said first, second and third pulses.

7. The logic circuit of claim 5 where each decimal digit in said addend is represented in BCD form by four bit signals and where each augend digit is represented in BCD form by four bit signals, said bit signals indicating the quantities 8, 4, 2 and 1 respectively, said first logic circuit means comprising a fifth logic circuit means for producing the carry propagate (P) and carry generate (G) pulses for each bit in the BCD summation, a sixth logic circuit means connected to said fifth circuit means for combining said G and P pulses to produce a fourth pulse indicative of a summation of the 8, 4 and 2 order bits equal to or greater than 12 at each digit position, a fifth pulse indicative of a summation of the 8, 4 and 2 order bits equal to or greater than 10 at each digit position, and a sixth pulse indicative of a summation of the 8, 4 and 2 order bits equal to or greater than 8 at each digit position, a seventh logic circuit means connected to said sixth logic circuit means for combining said fourth, fifth and sixth pulses together with the one order bits at each digit position to produce said second and third pulses.

8. A logic system for determining a binary sum of all ones which makes use of the half-sum (H), carry propagate (P) and carry generate (G) pulses of each bit position in said sum together with a low order input carry signal $C_{in}$, comprising first logic circuit means for combining H and P pulses, second logic circuit means for combining H, G and $C_{in}$ pulses, and third logic circuit means for combining the outputs of said first and second logic circuit means and said input carry signal $C_{in}$, said first, second and third logic circuit means connected to receive and combine pulse inputs according to $$\text{ONES} = (\overline{H}_0 + \overline{P}_1 + \ldots + \overline{P}_{n-1} + \overline{C}_{in}) \cdot (H_0 + G_1) \cdot \ldots \cdot (H_{n-2} + G_{n-1}) \cdot (H_{n-1} + C_{in})$$

where the subscripts 0 to n-1 refer to bit positions, high to low order, respectively, in an n-bit sum.

9. A logic system for detecting a binary sum of all ones which makes use of the half-sum (H) and carry generate (G) pulses of each bit position in said sum together with a low order input carry signal $C_{in}$ and the high order output carry signal $C_{out}$, comprising, first logic circuit means for combining H, G and $C_{in}$ pulses, second logic circuit means for combining the outputs of said first logic circuit means with the $C_{out}$ signal, said first and second logic circuit means connected to receive and combine pulse inputs according to $$\text{ONES} = \overline{C}_{out} \cdot (H_0 + G_1) \cdot \ldots \cdot (H_{n-2} + G_{n-1}) \cdot (H_{n-1} + C_{in}) + \overline{H}_0 \cdot (H_0 + G_1) \cdot \ldots \cdot (H_{n-2} + G_{n-1}) \cdot (H_{n-1} + C_{in})$$

where the subscripts 0 to $n-1$ refer to bit positions, high to low order, respectively, in an $n$-bit sum.

10. A logic system for detecting a binary sum of all ones which makes use of the half-sum (H), carry propagate (P) and carry generate (G) pulses of each bit position in said sum together with a low order input carry signal $C_{in}$, and an intermediate order output carry signal $C_K$, comprising
first logic circuit means for combining H and P pulses, second logic circuit means for combining H, G and $C_{in}$ pulses, and third logic circuit means for combining the outputs of said first and second logic circuit means and said carry signal $C_K$, said first, second and third logic circuit means connected to receive and combine inputs according to $$\text{ONES} = (\overline{H}_0 + \overline{P}_1 + \ldots + \overline{P}_{K-1} + \overline{C}_K) \cdot (H_0 + G_1) \cdot \ldots \cdot (H_{n-2} + G_{n-1}) \cdot (H_{n-1} + C_{in})$$

where the subscripts 0 to n-1 refer to bit positions, high to low order, respectively, in an $n$-bit sum.

11. A logic system for detecting a sum where all digits are equal to the radix $r$ less one where the addend and augend digits are numbers to the same said radix $r$,
first logic circuit means for producing a set of three pulses for each digit position in said sum, the first pulse indicative of a summation of the addend-augend pair equal to $2(r-1)$, the second pulse indicative of a summation of the addend-augend pair equal to the radix less one, and the third pulse indicative of a summation of the addend-augend pair equal to the radix less two,
second logic circuit means for combining said first pulse of the first digit position and said third pulse for each digit position together with a low order input carry signal $C_{in}$,
third logic circuit means for combining said first and second pulses of the digit positions together with said signal $C_{in}$,
fourth logic circuit means for combining the outputs of said second and third logic circuit means, said four logic circuit means connected according to $$\text{SDRLO} = [(0)_{2(r-1)} + (0)_{r-2} + \ldots + (n-1)_{r-2} + \overline{C}_{in}] \cdot [(0)_{r-1} + (1)_{2(r-1)}] \cdot \ldots \cdot [(n-2)_{r-1} + (n-1)_{2(r-1)}] \cdot [(n-1)_{r-1} + C_{in}]$$

where $n-1$ refers to the low order digit position in an $n$-digit sum and where SDRLO stands for the summation of all digits equal to a radix less one.

12. A logic system for detecting a decimal sum of all nines comprising
first logic circuit means for producing a set of three pulses for each digit position in said sum, the first pulse indicative of a summation of the addend-augend pair equal to eighteen, the second pulse indicative of a summation of the addend-augend pair equal to nine, and the third pulse indicative of a summation of the addend-augend pair equal to eight,
second logic circuit means for combining said first pulse of the first digit position and said third pulse for each digit position together with a low order input carry signal $C_{in}$,
third logic circuit means for combining said first and second pulses of the positions together with said signal $C_{in}$,
fourth logic circuit means for combining the outputs of said second and third logic circuit means, said logic circuit means connected according to $$\text{SDRLO} = [(0)_{18} + (0)_8 + \ldots + (n-1)_8 + \overline{C}_{in}] \cdot [(0)_9 + (1)_{18}] \cdot \ldots \cdot [(n-2)_9 + (n-1)_{18}] \cdot [(n-1)_9 + C_{in}]$$

where $n$ refers to the low order digit position in an $n$-digit decimal sum and where SDRLO stands for the summation of all digits equal to a radix less one.

13. The logic system according to claim 12 where each decimal digit in said addend is represented in BCD form by four bit signals and where each augend digit is represented in BCD form by four bit signals, said bit signals indicating the quantities 8, 4, 2 and 1 respectively, wherein said first logic circuit means is comprised of a fifth logic circuit means for producing the carry propagate (P) and carry generate (G) pulses for each bit in the BCD summation, and
a sixth logic circuit connected to said fifth circuit means for combining said G and P pulses to produce said first, second and third pulses.

14. The logic circuit of claim 12 where each decimal digit in said addend is represented in BCD form by four bit signals and where each augend digit is represented in BCD form by four bit signals, said bit signals indicating the quantities 8, 4, 2 and 1 respectively, said first logic circuit means comprising
a fifth logic circuit means for producing the carry propagate (P) and carry generate (G) pulses for each bit in the BCD summation,
a sixth logic circuit means connected to said fifth circuit means for combining said G and P pulses to produce a fourth pulse indicative of a summation of the 8, 4 and 2 order bits equal to or greater than 10 at each digit position, a fifth pulse indicative of a summation of the 8, 4 and 2 order bits equal to or greater than 8 at each digit position, and a sixth pulse indicative of a summation of the 8, 4 and 2 order bits equal to or greater than 6 at each digit position, and
a seventh logic circuit means for combining said fourth, fifth and sixth pulses together with the one order bits at each digit position to produce said second and third pulses.

15. A logic system for detecting a sum where all digits are equal to zero and where all digits are equal to the radix less one, where the addend and augend digits are numbers to the radix $r$,
first logic circuit means for producing a set of five pulses for each digit position in said sum, the first pulse indicative of a summation of the addend-augend pair equal to zero, the second pulse indicative of a summation of the addend-augend equal to the radix less one, the third pulse indicative of a summation of the addend-augend pair equal to the radix, a fourth pulse indicative of a summation of the addend-augend pair equal to the radix less two, and a fifth pulse indicative of a summation of the addend-augend pair equal to $2(r-1)$,
second logic circuit means for combining said first pulse of the first digit position and said third pulse for each digit position together with a low order input carry signal $C_{in}$, third logic circuit means for combining said first and second pulses of the digit positions together with said signal $C_{in}$, fourth logic circuit means for combining the outputs of said second and third logic circuit means, said four logic circuit means connected according to $$\text{ZEROES} = [(0)_{o,r} + (1)_r + \ldots + (n-1)_r + C_{in}] \cdot [(0)_{r-1} + (1)_0] \cdot \ldots \cdot [(n-2)_{r-1} + (n-1)_0] \cdot [(n-1)_{r-1} + \overline{C}_{in}]$$

where $n-1$ refers to the low order digit position in an $n$-digit sum, fifth logic circuit means for combining said fifth pulse of the first digit position and said fourth pulse for each digit position together with said $C_{in}$ signal, sixth logic circuit means for combining said fifth and second pulses of the digit positions together with said $C_{in}$, seventh logic circuit means for combining the outputs of said fifth and sixth logic circuit menas, said first, fifth, sixth and seventh logic circuit means connected according to $$\text{SDRLO} = [(0)_{2(r-1)} + (0)_{r-2} + \ldots + (n-1)_{r-2} + \overline{C}_{in}] \cdot [(0)_{r-1} + (1)_{2(r-1)}] \cdot \ldots \cdot [(n-2)_{r-1} + (n-1)_{2(r-1)}] \cdot [(n-1)_{r-1} + C_{in}]$$

where $n-1$ refers to the low order digit position in an $n$-digit sum, and where SDRLO refers to the sum of the digits equal to the radix less one.

16. A logic system for detecting a decimal sum where all the digits are equal to zero and where all the digits are equal to nines, comprising first logic circuit means for producing a set of five pulses for each digit position in said sum, the first pulse indicative of a summation of the addend-augend pair equal to zero, the second pulse indicative of a summation of the addend-augend pair equal to nine, the third pulse indicative of a summation of the addend-augend pair equal to 10, the fourth pulse indicative of a summation of the addend-augend pair equal to eight, and the fifth pulse indicative of a summation of the addend-augend pair equal to 18, second logic circuit means for combining said first pulse of the first digit position and third pulses for each digit position together with a low order carry signal $C_{in}$, third logic circuit means for combining said first and second pulses of the digit positions together with said signal $C_{in}$, fourth logic circuit means for combining the outputs of said second and third logic circuit means, said four logic circuit means connected according to $$\text{ZEROES} = [(0)_{0,10} + (1)_{10} + \ldots + (n-1)_{10} + C_{in}] \cdot [(0)_9 + (1)_0] \cdot \ldots \cdot [(n-2)_9 + (n-1)_0] \cdot [(n-1)_9 + \overline{C}_{in}]$$

where $n-1$ refers to the low order digit position in an $n$-digit sum, fifth logic circuit means for combining said fifth pulse of the first digit position and fourth pulses for each digit position together with said signal $C_{in}$, sixth logic circuit means for enabling said fifth and second pulses of the digit positions together with said signal $C_{in}$, and seventh logic circuit means for combining the outputs of said fifth and sixth logic circuit means, said first, fifth, sixth and seventh logic circuit means connected according to $$\text{NINES} [(0)_{18} + (0)_8 + \ldots + (n-1)_8 + \overline{C}_{in}] \cdot [(0)_9 + (1)_{18}] \cdot \ldots \cdot [(n-2)_9 + (n-1)_{18}] \cdot [(n-1)_9 + C_{in}]$$

where $n-1$ refers to the low order digit position in an $n$-digit sum.

17. The logic system according to claim 16 where each decimal digit in said sum is represented in BCD form by four bit signals and where each augend digit is represented in BCD form by four bit signals, said bit signals indicating the quantities 8, 4, 2 and 1 respectively, said first logic circuit means including an eighth logic circuit means for producing the carry propagate (P) and carry generate (G) pulses for each bit in the BCD summation and a ninth logic circuit means for combining said G and P pulses to produce said five pulses.

18. The logic circuit of claim 16 where each decimal digit in said addend is represented in BCD form by four bit signals and where each augend digit is represented in BCD form by four bit signals, said bit signals indicating the quantities 8, 4, 2 and 1 respectively, said first logic circuit means including an eighth logic circuit means for producing the carry propagate (P) and carry generate (G) pulses for each bit in the BCD summation, a ninth logic circuit means connected to said eighth logic circuit means for combining said G and P pulses to produce a sixth pulse indicative of a summation of the 8, 4 and 2 order bits equal to or greater than 12 at each digit position, a seventh pulse indicative of a summation of the 8, 4 and 2 order bits equal to or greater than 10 at each digit position, an eighth pulse indicative of a summation of the 8, 4 and 2 order bits equal to or greater than 8 at each digit position, a ninth pulse indicative of a summation of the 8, 4 and 2 order bits equal to or greater than six at each digit position, and a tenth logic circuit means for combining said sixth, seventh, eighth and ninth pulses together with the one order bits at each digit position to produce said second, third and fourth pulses.

* * * * *